(12) United States Patent  (10) Patent No.: US 9,210,291 B2
Ichikawa  (45) Date of Patent: Dec. 8, 2015

(54) IMAGE PROCESSING APPARATUS CAPABLE OF SYNTHESIZING FORM IMAGE WITH AGGREGATE IMAGE, METHOD OF CONTROLLING THE SAME, AND STORAGE MEDIUM

(71) Applicant: CANON KABUSHIKI KAISHA, Tokyo (JP)

(72) Inventor: Masanori Ichikawa, Kawasaki (JP)

(73) Assignee: CANON KABUSHIKI KAISHA (JP)

( * ) Notice: Subject to any disclaimer, the term of this patent is extended or adjusted under 35 U.S.C. 154(b) by 0 days.

(21) Appl. No.: 14/060,671

(22) Filed: Oct. 23, 2013

(65) Prior Publication Data

US 2014/0111828 A1  Apr. 24, 2014

(30) Foreign Application Priority Data

Oct. 23, 2012 (JP) ................. 2012-233625

(51) Int. Cl.
*H04N 1/387* (2006.01)
*H04N 1/00* (2006.01)

(52) U.S. Cl.
CPC ........... *H04N 1/387* (2013.01); *H04N 1/00278* (2013.01); *H04N 1/00411* (2013.01); *H04N 1/00456* (2013.01); *H04N 1/3875* (2013.01); *H04N 1/00482* (2013.01); *H04N 2201/0094* (2013.01)

(58) Field of Classification Search
None
See application file for complete search history.

(56) References Cited

U.S. PATENT DOCUMENTS

| 8,654,391 | B2 * | 2/2014 | Muramoto | 358/1.18 |
| 2003/0190089 | A1 * | 10/2003 | Katsuda et al. | 382/284 |
| 2007/0216973 | A1 * | 9/2007 | Tagawa | 358/527 |
| 2007/0223900 | A1 * | 9/2007 | Kobayashi et al. | 396/50 |
| 2009/0091770 | A1 * | 4/2009 | Kano et al. | 358/1.1 |
| 2009/0316163 | A1 * | 12/2009 | Hanawa | 358/1.6 |
| 2012/0044173 | A1 * | 2/2012 | Homma et al. | 345/173 |
| 2013/0155423 | A1 * | 6/2013 | Shibata | 358/1.2 |
| 2013/0198668 | A1 * | 8/2013 | Matas et al. | 715/767 |
| 2014/0104657 | A1 * | 4/2014 | Yamaneki | 358/3.01 |

FOREIGN PATENT DOCUMENTS

JP  2007-306263 A  11/2007

* cited by examiner

*Primary Examiner* — Hilina K Demeter
(74) *Attorney, Agent, or Firm* — Rossi, Kimms & McDowell LLP

(57) ABSTRACT

An image processing apparatus capable of synthesizing a form image with an aggregate image created by aggregating images on one page. A CPU determines whether an operator performed on a touch panel a first operation for changing an image with which the form image is to be synthesized from an image as an operation target to one of the images of the aggregate image or the whole aggregate image, or a second operation for rotating the form image synthesized with the operation target image. When the first operation is performed, the CPU synthesizes the form image with the changed image after scaling the form image to the size of the changed image. When the second operation is performed, the CPU synthesizes the form image with the operation target image after rotating the form image and scaling the same to the size of the operation target image.

6 Claims, 24 Drawing Sheets

FIG. 11A

PATTERN TABLE USED FOR 2-in-1 SETTINGS

| PATTERN | POINT 1 | POINT 2 | AREA DESIGNATION |
|---|---|---|---|
| 1 | AREA 1 | AREA 2 | IMAGE AREA A |
| 2 | AREA 1 | AREA 3 | IMAGE AREA A |
| 3 | AREA 1 | AREA 4 | WHOLE AREA |
| 4 | AREA 2 | AREA 4 | IMAGE AREA B |
| 5 | AREA 3 | AREA 4 | IMAGE AREA B |

FIG. 11B

PATTERN TABLE USED FOR 4-in-1 SETTINGS

| PATTERN | POINT 1 | POINT 2 | AREA DESIGNATION |
|---|---|---|---|
| 1 | AREA 1 | AREA 2 | IMAGE AREA AB |
| 2 | AREA 1 | AREA 3 | IMAGE AREA AB |
| 3 | AREA 1 | AREA 5 | IMAGE AREA BD |
| 4 | AREA 1 | AREA 6 | IMAGE AREA B |
| 5 | AREA 1 | AREA 7 | IMAGE AREA B |
| ... | ... | ... | ... |

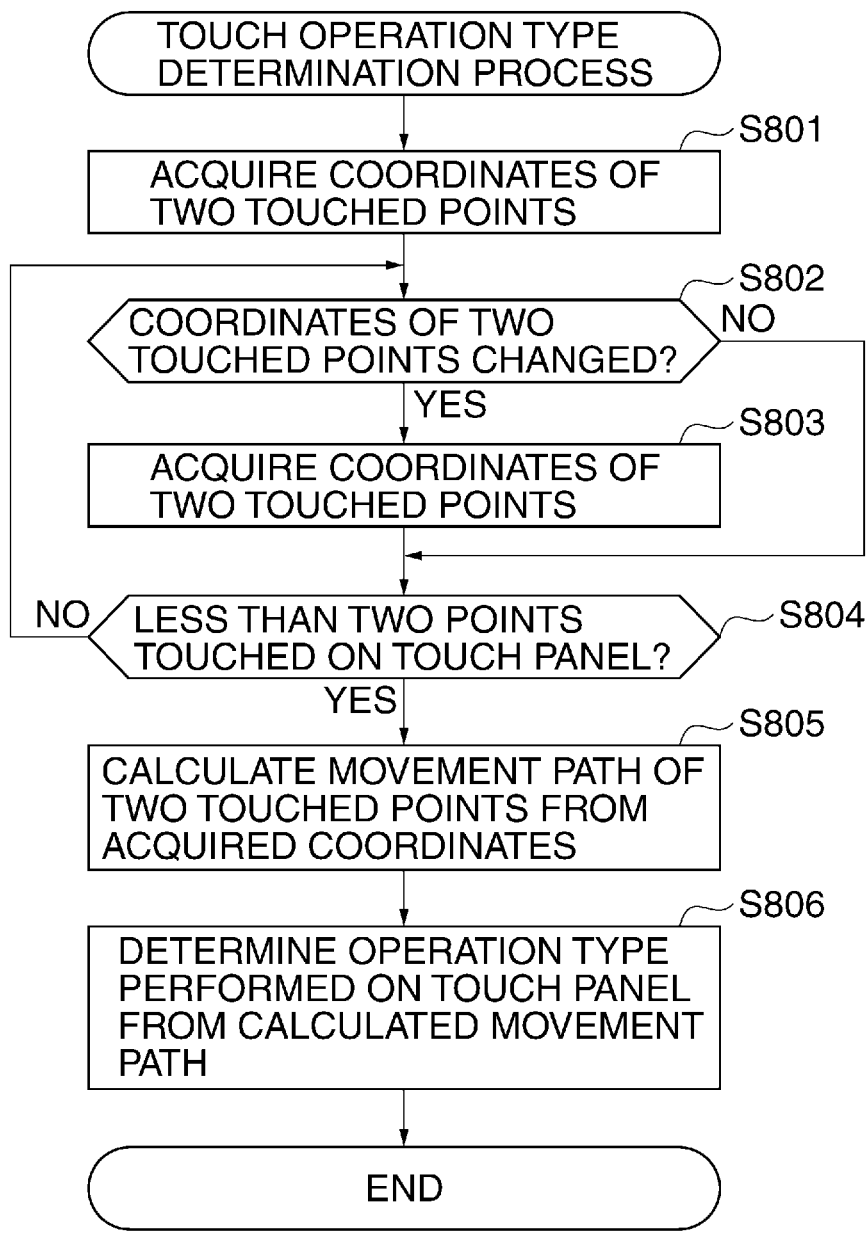

FIG. 21C

COPY

Form image can be edited.

PREVIEW

| REPEAT | REPEAT | REPEAT | REPEAT | XXX Co., Ltd.<br>REPEAT<br>CONFIDENTIAL |
|--------|--------|--------|--------|------------------------------------------|
| REPEAT | REPEAT | REPEAT | REPEAT | REPEAT |
| REPEAT | REPEAT | REPEAT | REPEAT | REPEAT |
| REPEAT | REPEAT | REPEAT | REPEAT | REPEAT |

SETTINGS

FORM IMAGE EDIT TERMINATION

LOGOUT

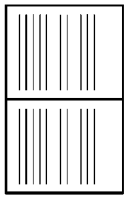

IMAGE PROCESSING APPARATUS CAPABLE OF SYNTHESIZING FORM IMAGE WITH AGGREGATE IMAGE, METHOD OF CONTROLLING THE SAME, AND STORAGE MEDIUM

BACKGROUND OF THE INVENTION

1. Field of the Invention

The present invention relates to an image processing apparatus that is capable of synthesizing a form image with an aggregate image, a method of controlling the same, and a storage medium.

2. Description of the Related Art

Along with improvement in performance of recent display devices, such as an operation panel, image processing apparatuses have come to be equipped with a function of previewing data stored in a hard disk provided therein and data obtained by scanning a sheet of an original.

Further, the image processing apparatuses also have a form synthesizing function in which a form stored e.g. in a hard disk of the image processing apparatus in advance and an input image are synthesized for printing.

In the form synthesizing function, when synthesizing a form and an image, an operator can check whether or not the form and the image are synthesized as desired, on the operation panel before printing the synthesized image.

As a conventional technique related to the above-mentioned form synthesizing function, there has been disclosed a technique for providing a means for editing and manipulating a form image, during preview of the form-synthesized image (see e.g. Japanese Patent Laid-Open Publication No. 2007-306263).

However, in the technique disclosed in Japanese Patent Laid-Open Publication No. 2007-306263, when using the form synthesizing function in combination with a function of printing N sheets of originals in a state collectively arranged on one sheet, editing of the form image is not taken into consideration.

For example, when two sheets of originals are laid out on one sheet, two cases can be thought of: one in which the operator desires to synthesize the form with each original, and the other in which the operator desires to lay out the two sheets of originals on one sheet and then synthesize the form with a resulting image formed by the layout.

In these cases, the technique disclosed in Japanese Patent Laid-Open Publication No. 2007-306263 enables adjustment of only a position, a direction, a color, and a size of the form image, and hence it is necessary to prepare respective form images for use in the cases in advance.

Further, there has been proposed an image processing apparatuses equipped with an image repeating function in which a predetermined image is repeatedly formed and a plurality of the images thus formed are laid out on one sheet. In a case where the form synthesizing function is used in combination with the image repeating function, it can be envisaged that the user desires to apply a predetermined form image, on a repeated image-by-repeated image basis.

In this case, it is necessary to prepare a form image created by repeatedly forming a form image having the same size as that of the repeated image and arranging a plurality of the form images thus formed. However, there is a possibility that the repeated image has an irregular shape, and hence it is difficult for the operator to prepare such a form image adapted to the repeated image in advance.

SUMMARY OF THE INVENTION

The present invention provides an image processing apparatus that is capable of synthesizing a form image with an aggregate image created by aggregating a plurality of images on one page, a method of controlling the same, and a storage medium.

In a first aspect of the present invention, there is provided an image processing apparatus including a display unit and an operation unit, comprising an aggregate image creation unit configured to create an aggregate image by aggregating a plurality of images on one page, a first synthesis unit configured to synthesize the aggregate image created by the aggregate image creation unit and a form image, a first display control unit configured to control the display unit to display a synthesized image synthesized by the first synthesis unit, a determination unit configured to determine whether an operation performed by an operator on the operation unit is a first operation for changing an image with which the form image is to be synthesized from an image as a current operation target by the operator to one of the plurality of images included in the aggregate image or the whole aggregate image, or a second operation for rotating the form image synthesized with the image as the current operation target by the operator, a second synthesis unit configured, when it is determined by the determination unit that the operation performed by the operator is the first operation, to synthesize the form image with the changed image after scaling the form image to the size of the changed image, a third synthesis unit configured, when it is determined by the determination unit that the operation performed by the operator is the second operation, to synthesize the form image with the image as the operation target by the operator after rotating the form image and scaling the form image to the size of the image as the operation target by the operator, and a second display control unit configured to control the display unit to display an image synthesized by the second synthesis unit or the third synthesis unit.

In a second aspect of the present invention, there is provided an image processing unit comprising a reading unit configured to read an original to thereby create an original image, a storage unit configured to store the original image, a creation unit configured to create a print image by synthesizing the original image with a form image designated by a user, a print unit configured to print the print image created by the creation unit, and a decision unit configured, when a plurality of original images are aggregated on one page for printing, to decide based on a user's instruction whether to synthesize the form image with each of the plurality of original images or with the whole aggregate image formed by aggregating the plurality of original images on one page.

In a third aspect of the present invention, there is provided a method of controlling an image processing apparatus including a display unit and an operation unit, comprising creating an aggregate image by aggregating a plurality of images on one page, synthesizing an aggregate image created by said creating and a form image, controlling the display unit to display an image synthesized by said synthesizing, determining whether an operation performed by an operator on the operation unit is a first operation for changing an image with which the form image is to be synthesized from an image as a current operation target by the operator to one of the plurality of images included in the aggregate image or the whole aggregate image, or a second operation for rotating the form image synthesized with the image as the current operation target by the operator, synthesizing, when it is determined by said determining that the operation performed by the operator is the first operation, the form image with the changed image after scaling the form image to the size of the changed image, synthesizing, when it is determined by said determining that the operation performed by the operator is the second operation, the form image with the image as the operation target by the operator after rotating the form image and scaling the form image to the size of the image as the operation target by the operator, and controlling the display unit to display an image synthesized by said synthesizing according to said determining.

In a fourth aspect of the present invention, there is provided a method of controlling an image processing unit, comprising reading an original to thereby create an original image, storing the original image, creating a print image by synthesizing the original image with a form image designated by a user, printing the print image created by said creating, and deciding, when a plurality of original images are aggregated on one page for printing, based on a user's instruction whether to synthesize the form image with each of the plurality of original images or with the whole aggregate image formed by aggregating the plurality of original images on one page.

In a fifth aspect of the present invention, there is provided a non-transitory computer-readable storage medium storing a computer-executable control program for causing a computer to execute a method of controlling an image processing apparatus including a display unit and an operation unit, wherein the method comprises creating an aggregate image by aggregating a plurality of images on one page, synthesizing an aggregate image created by said creating and a form image, controlling the display unit to display an image synthesized by said synthesizing, determining whether an operation performed by an operator on the operation unit is a first operation for changing an image with which the form image is to be synthesized from an image as a current operation target by the operator to one of the plurality of images included in the aggregate image or the whole aggregate image, or a second operation for rotating the form image synthesized with the image as the current operation target by the operator, synthesizing, when it is determined by said determining that the operation performed by the operator is the first operation, the form image with the changed image after scaling the form image to the size of the changed image, synthesizing, when it is determined by said determining that the operation performed by the operator is the second operation, the form image with the image as the operation target by the operator after rotating the form image and scaling the form image to the size of the image as the operation target by the operator, and controlling the display unit to display an image synthesized by said synthesizing according to said determining.

In a sixth aspect of the present invention, there is provided a non-transitory computer-readable storage medium storing a computer-executable control program for causing a computer to execute a method of controlling an image processing apparatus, wherein the method comprises reading an original to thereby create an original image, storing the original image, creating a print image by synthesizing the original image with a form image designated by a user, printing the print image created by said creating, and deciding, when a plurality of original images are aggregated on one page for printing, based on a user's instruction whether to synthesize the form image with each of the plurality of original images or with the whole aggregate image formed by aggregating the plurality of original images on one page.

According to the present invention, it is possible to provide an image processing apparatus that is capable of synthesizing a form image with an aggregate image created by aggregating a plurality of images on one page, a method of controlling the same, and a storage medium.

Further features of the present invention will become apparent from the following description of exemplary embodiments with reference to the attached drawings.

BRIEF DESCRIPTION OF THE DRAWINGS

FIGS. 11A and 11B are diagrams showing predetermined patterns.

FIG. 12 is a flowchart of a touch operation type determination process executed in a step in FIG. 9.

FIGS. 21A to 21C are diagrams showing examples of a screen displayed on the console section appearing in FIG. 2 in the second variation.

FIGS. 22A and 22B are diagrams showing examples of a screen displayed on the console section appearing in FIG. 2 in the second variation.

DESCRIPTION OF THE EMBODIMENTS

The present invention will now be described in detail below with reference to the accompanying drawings showing embodiments thereof.

Figure 1:
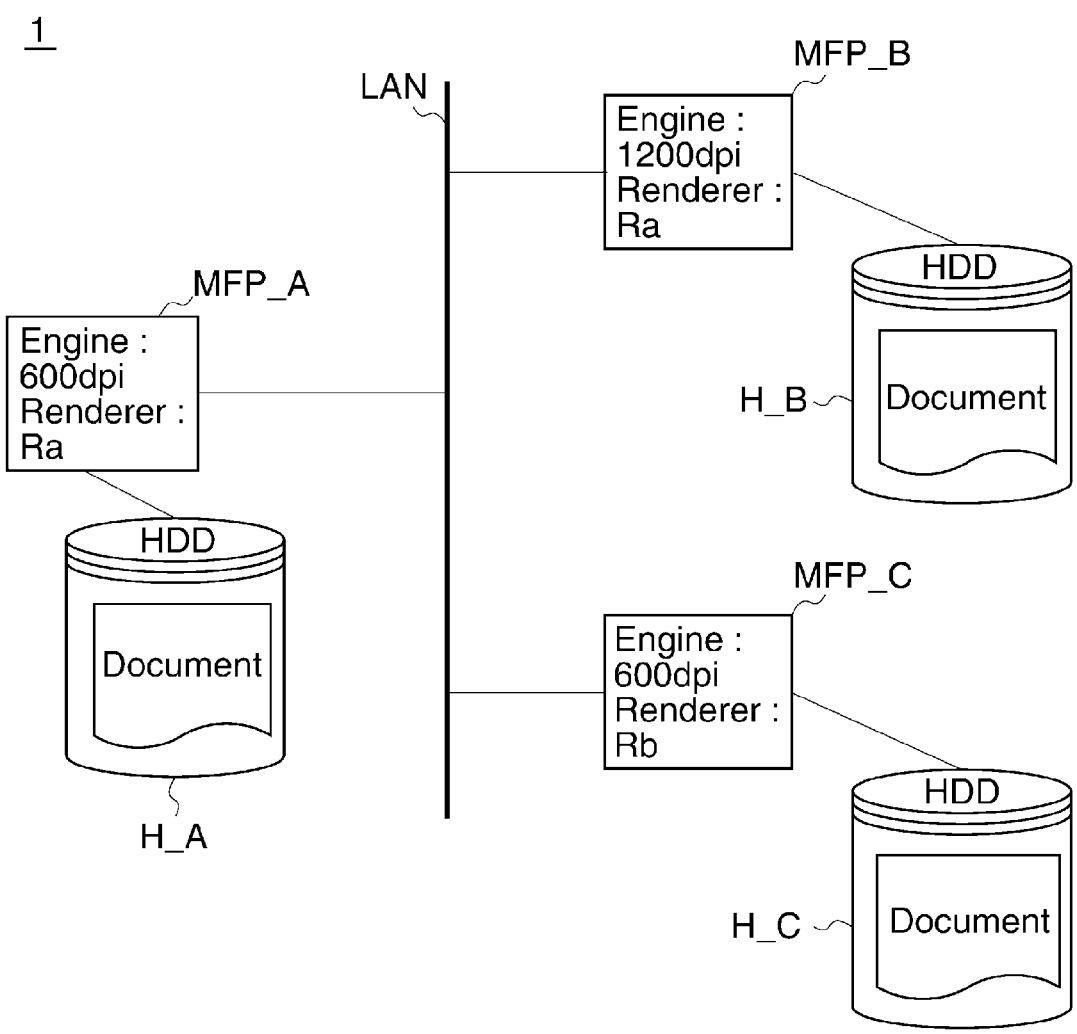
FIG. 1 is a schematic block diagram of an image processing system including an image processing apparatus according to an embodiment of the present invention.

FIG. 1 is a schematic block diagram of an image processing system 1 including an image processing apparatus according to an embodiment of the present invention.

Referring to FIG. 1, the image processing system 1 comprises a plurality of image processing apparatuses MFP_A, MFP_B, and MFP_C, which are interconnected via a LAN (local area network).

The image processing apparatuses include HDDs (hard disk drive) H_A, H_B, and H_C, respectively. Printer engines provided in the respective image processing apparatuses are different in resolution.

The image processing apparatuses MFP_A and MFP_C have a resolution of 600 dpi, and the image processing apparatus MFP_B has a resolution of 1200 dpi.

Further, also renderers (rasterizers) provided in the respective image processing apparatuses are different in type, and the image processing apparatuses MFP_A and MFP_B have the same renderer Ra, and the image processing apparatus MFP_C has a different renderer Rb.

In general, the renderer is implemented by hardware, such as an ASIC (application-specific integrated circuit), and hence renderers different in type cannot process rendering command groups different from those specifically intended therefor. The rendering command group is generally called a display list. The display list is an instruction that can be processed by hardware, and is resolution-dependent data generated by software based on vector data with complex rendering descriptions. In general, information, such as contour of characters, drawn in a relevant page is described in the vector data.

The image processing apparatuses MFP_A, MFP_B, and MFP_C can communicate with each other using a network protocol. The arrangement of the image processing apparatuses MFP_A, MFP_B, and MFP_C connected to the LAN is not limited to the physical arrangement shown in FIG. 1. Devices, such as PCs, various servers, and printers may be connected to the LAN.

Figure 2:
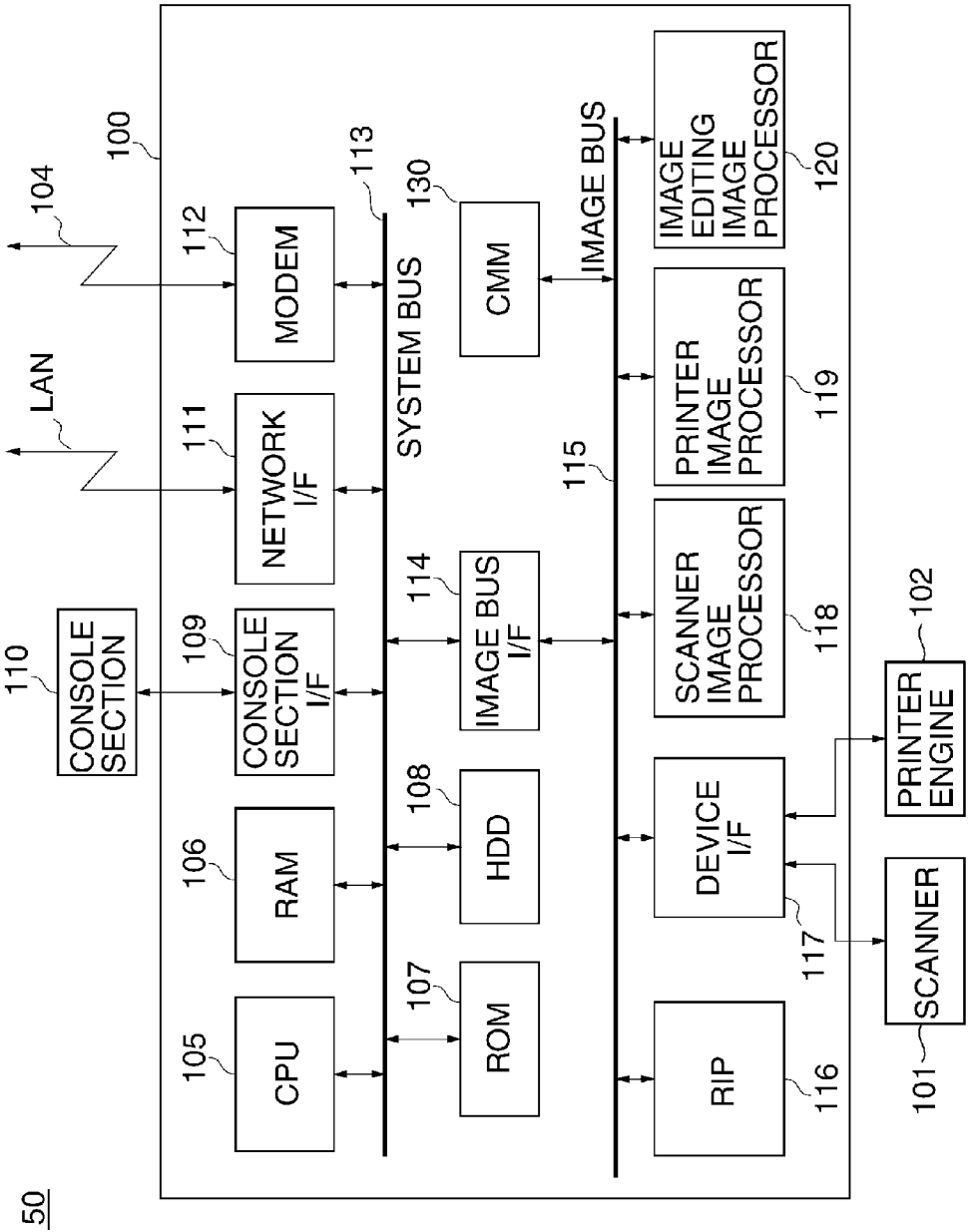
FIG. 2 is a schematic block diagram of the image processing apparatus according to the embodiment.

FIG. 2 is a schematic block diagram of the image processing apparatus, denoted by reference numeral 50, according to the embodiment of the present invention.

Referring to FIG. 2, the image processing apparatus 50 comprises a control unit 100, a console section 110, a scanner 101, and a printer engine 102.

The control unit 100 is connected to the scanner 101, the printer engine 102, and the console section 110, and performs control for reading image data and printing out image data. Further, the control unit 100 is connected to the LAN and a public communication line 104 and performs control for inputting and outputting image information and device information via the LAN and the public communication line.

Further, in the control unit 100, a CPU 105 is a central processing unit that controls the overall operation of the image processing apparatus 50. A RAM 106 is used as a system work memory necessary for operation of the CPU 105, and also functions as an image memory for temporarily storing input image data.

Further, a ROM 107 is a boot ROM that stores the system's boot program. A HDD (hard disk drive) 108 stores system software for various processes, input image data, and so forth. The HDD 108 further stores programs for executing processes, described hereinafter with reference to drawings, which are executed by the CPU 105.

A console section interface 109 interfaces with the console section 110, and outputs operation screen data to the console section 110. The console section interface 109 notifies the CPU 105 of information input by an operator from the console section 110. The console section 110 includes a display section (display unit) for displaying information to the operator and an operation section (operation unit) operated by the operator. Further, the display section is provided with a touch panel, and the operator can also operate the touch panel.

A network interface 111 is implemented e.g. by a LAN card, and is connected to the LAN to input and output information from and to external apparatuses. A modem 112 is connected to the public communication line 104 to input and output information from and to external apparatuses.

The CPU 105, the RAM 106, the console section interface 109, the network interface 111, the modem 112, the ROM 107, and the HDD 108, described above, are connected to each other via a system bus 113. Further, an image bus interface 114 is used as a bus bridge connecting the system bus 113 and an image bus 115 which transfers image data at high-speed.

Connected to the image bus 115 are a RIP (raster image processor) 116, a device interface 117, a scanner image processor 118, a printer image processor 119, an image editing image processor 120, and a CMM (color management module) 130.

The RIP 116 converts a page description language (PDL data) code or vector data, described hereinafter, into an image. The device interface 117 connects the scanner 101 and the printer engine 102 to the control unit 100, and performs synchronous-to-asynchronous or asynchronous-to-synchronous conversion of image data.

Further, the scanner image processor 118 performs various kinds of processing, such as correction, manipulation, and editing, of image data input from the scanner section 101. The printer image processor 119 performs correction, resolution conversion, etc. of image data to be printed out, according to the printer engine 102.

The image editing image processor 120 performs various kinds of processing, such as rotation of image data and compression and expansion of image data. The CMM 130 is a dedicated hardware module for performing color conversion (also referred to as "color space conversion") on image data based on a profile and calibration data.

The profile is information including a function for converting color image data expressed by a color space dependent on an apparatus to a color space (e.g. Lab) independent of the apparatus. The calibration data is for correcting color reproduction characteristics of the scanner 101 and the printer engine 102.

Figure 3:
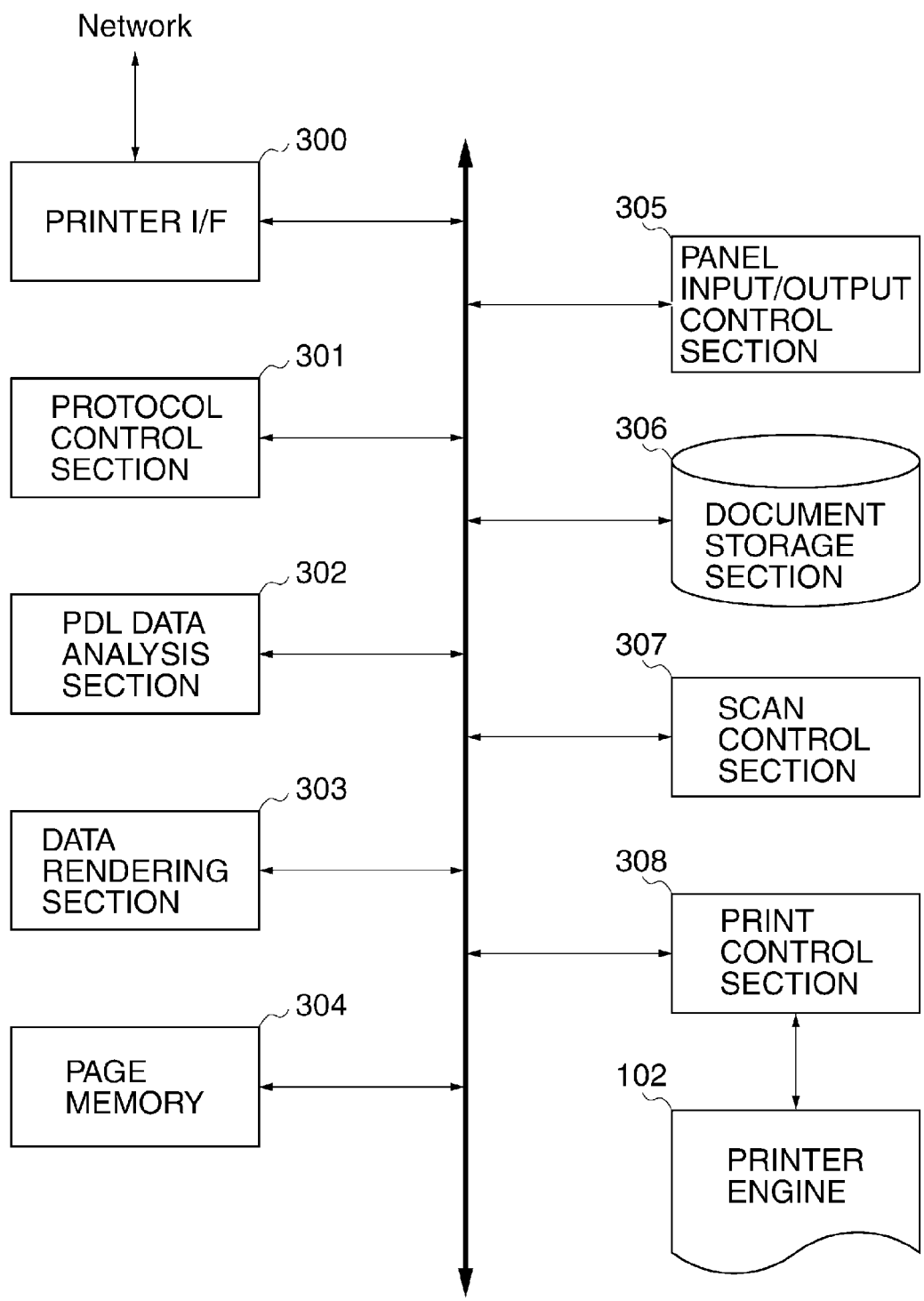
FIG. 3 is a block diagram of controller software that controls the operation of the image processing apparatus shown in FIG. 2.

FIG. 3 is a block diagram of controller software that controls the operation of the image processing apparatus 50 shown in FIG. 2.

A printer interface 300 provides interface for inputting and outputting data from and to the outside. A protocol control section 301 communicates with the outside by analyzing and transmitting a network protocol.

A PDL data analysis section 302 analyzes PDL data, and converts the PDL data to a display list in a format easier to process. The display list generated by the PDL data analysis section 302 is passed to a data rendering section 303 so as to be processed thereby. The data rendering section 303 rasterizes the display list to bitmap data, and the rasterized bitmap data is sequentially stored in a page memory 304.

The page memory 304 is allocated to one of areas of the RAM 106, wherein bitmap data rendered by the renderer is temporarily stored. A panel input/output control section 305 controls inputs and outputs to and from the console section 110.

A document storage section 306 is a storage area provided in the HDD 108, for storing data files. A scan control section 307 performs various kinds of processing, such as correction, manipulation, and editing, of image data input from the scanner section 101.

A print control section 308 performs processing for converting data stored in the page memory 304 to a video signal, and transfers images to the printer engine 102.

Figure 4:
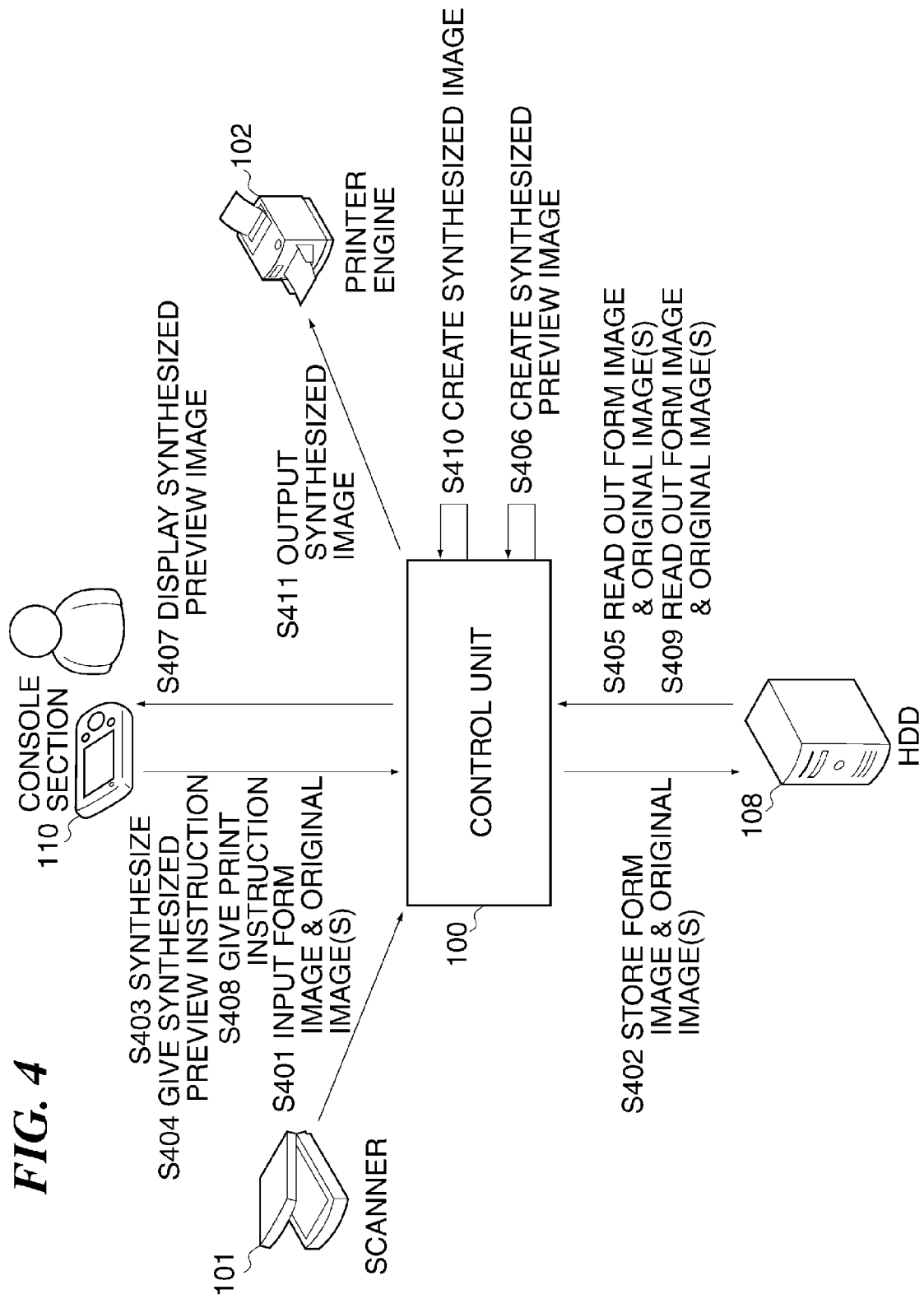
FIG. 4 is a diagram useful in explaining the outline of processes for preview and print performed by the image processing apparatus according to the embodiment.

FIG. 4 is a diagram useful in explaining the outline of processes for preview and print according to the present embodiment.

Referring to FIG. 4, original images and a form image are input from the scanner 101 (step S401) and are stored in the HDD 108 under the control of the control unit 100 (step S402).

On the console section 110, the original images and the form image stored in the HDD 108 are synthesized according to the synthesis settings set by the operator (step S403), and the operator gives a synthesized preview instruction (step S404). Then, the console section 110 displays a preview image created according to the synthesis preview instruction (step S407).

Further, the operator selects the created synthesized image, and gives a print instruction (step S408). The control unit 100 having received the synthesis preview instruction or the print instruction accesses the HDD 108 to read out the selected synthesized image (steps S405 and S409), creates a preview image (step S406), and creates a print image (step S410). The image created according to the preview instruction is sent to the console section 110, whereas the image created according to the print instruction is sent to the printer engine 102 (step S411).

Figure 5:
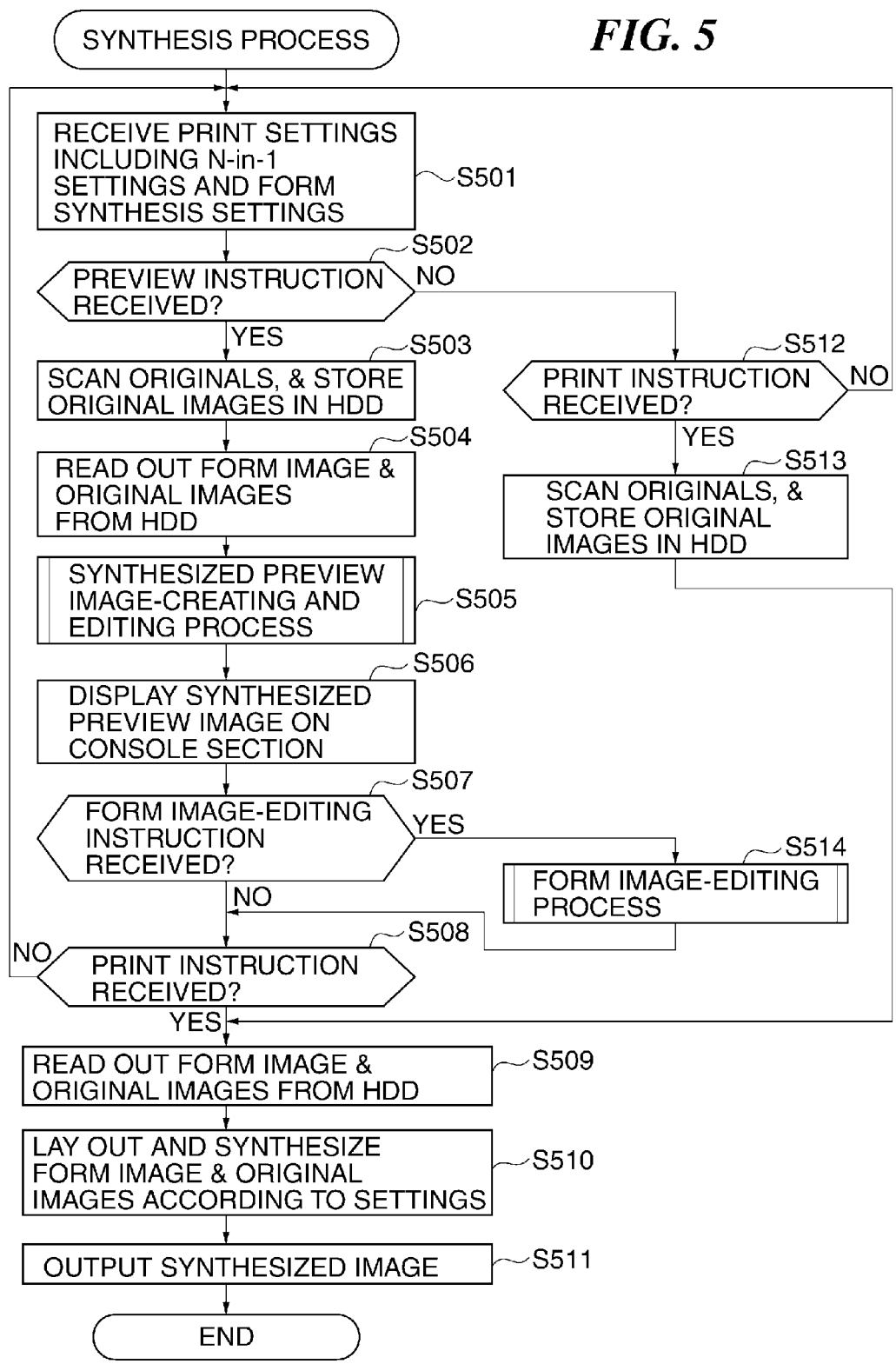
FIG. 5 is a flowchart of a synthesis process executed by a CPU appearing in FIG. 2.

FIG. 5 is a flowchart of a synthesis process executed by the CPU 105 appearing in FIG. 2.

In the present embodiment, to lay out images of a plurality of pages on one page is referred to as aggregation, and the images which have been collectively arranged are referred to as the aggregate image. Particularly, page layout in which images of N pages are arranged on one page is referred to as N-in-1. Further, the term "layout number" in the present embodiment is intended to mean the number of original images to be aggregated on one page in N-in-1 settings.

Further, the term "layout image" is intended to mean one image created by aggregating a layout number of original images on one page according to the N-in-1 settings (image repeat). The term "layout size" (original layout size) is intended to mean a size assigned to each original image when a layout number of original images are aggregated on one page according to the N-in-1 settings.

Further, the term "layout position" is intended to mean a position where each original is disposed when a layout number of original images are aggregated on one page according to the N-in-1 settings.

Referring to FIG. 5, the CPU 105 receives print settings including N-in-1 settings and form synthesis settings from the operator (step S501). The term "N-in-1 settings" is intended to include e.g. settings of an original size (document size), a print size, and selection of a layout number (selection from 2-in-1, 4-in-1, and 8-in-1), and the term "form synthesis settings" is intended to include a setting of designation of a form image.

Then, the CPU 105 determines whether or not a preview instruction has been received from the operator (step S502).

Figure 6A:
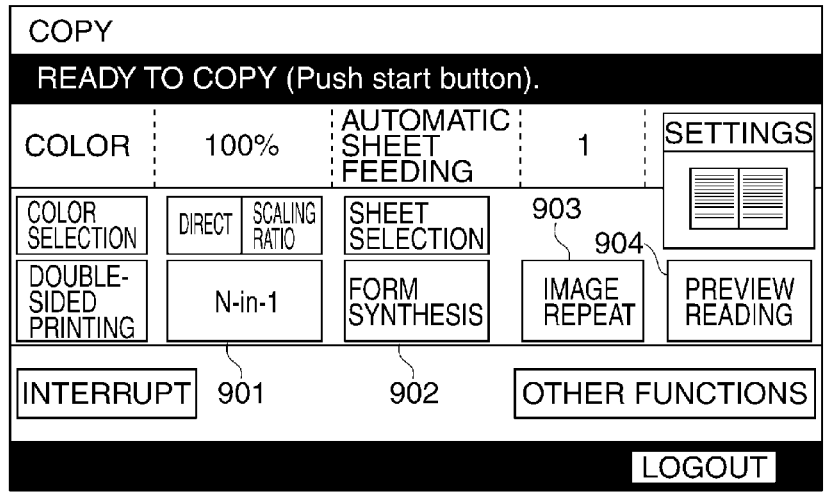
FIGS. 6A to 6C are diagrams showing examples of a screen displayed on a console section appearing in FIG. 2.
Figure 6B:
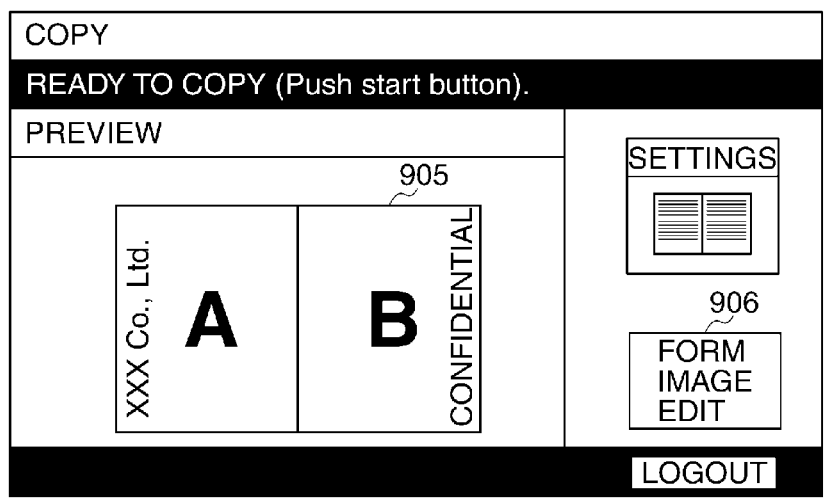
Figure 6C:
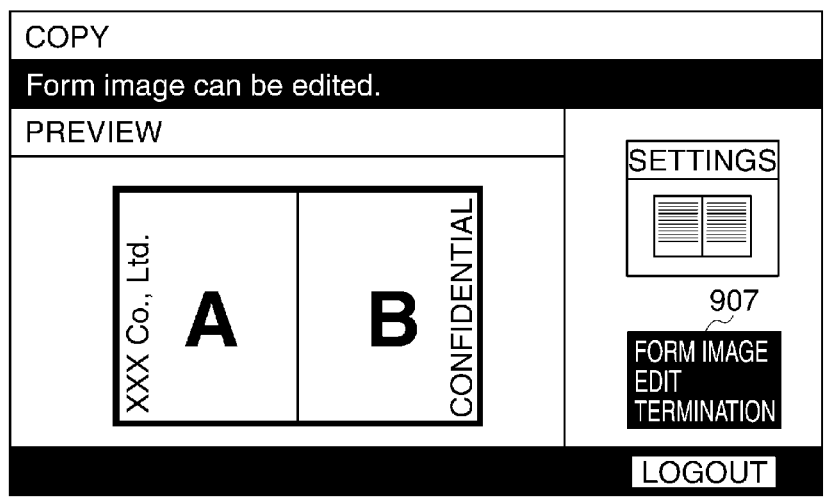

The determination in the step S502 will be described with reference to FIG. 6A. FIGS. 6A to 6C are diagrams showing examples of a screen displayed on the console section 110 appearing in FIG. 2, and FIG. 6A shows a copy setting screen. Referring to FIG. 6A, an N-in-1 button 901 is a button for aggregating images, a form synthesis button 902 is a button for synthesizing a form, an image repeat button 903 is a button for executing an image repeating function, described hereinafter, and a preview read button 904 for reading and displaying preview data.

The determination in the step S502 is performed according to determination of whether or not the preview read button 904 in FIG. 6A has been depressed.

If it is determined in the step S502 that a preview instruction has been received from the operator (YES to the step S502), the CPU 105 scans originals and stores original images in the HDD 108 (step S503).

Then, the CPU 105 reads out a stored form image and the original images from the HDD 108 and loads these images into the RAM 106 (step S504). Note that the form image has been registered by the operator in advance in the image processing apparatus 50.

Then, the CPU 105 creates and edits a synthesized preview image according to the settings received in the step S501 (step S505). The step S505 will be described in detail hereinafter.

Figure 7:
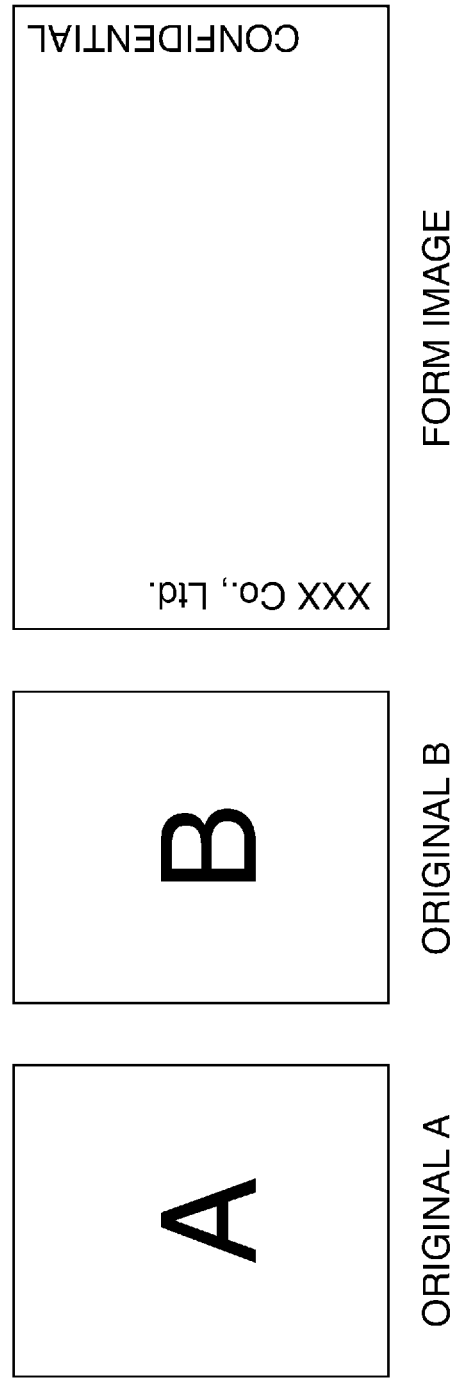
FIG. 7 is a diagram showing originals and a form image.

Then, the CPU 105 displays the synthesized preview image which has been created in the step S505 on the console section 110 (step S506). FIG. 6B shows an example of display of the synthesized preview image, denoted by reference numeral 905. Further, FIG. 7 shows an original image A, an original image B, and the form image, which are formed into the synthesized preview image. The step S506 corresponds to the operation of a first display control unit configured to control the display unit to display a synthesized image.

Then, the CPU 105 determines whether or not an instruction for editing the form image has been received (step S507). In this step, it is determined whether or not an image edit button 906 appearing in FIG. 6B has been depressed. If the image edit button 906 appearing in FIG. 6B has been depressed, an operation screen is displayed on the screen of the console section 110, whereby an editing operation for synthesizing the form image is enabled. FIG. 6C shows an example of the operation screen displayed when the image edit button 906 has been depressed. As shown in FIG. 6C, the edges of the form image are distinctively displayed so as to enable the operator to recognize an area in which the form image is synthesized. In this case, the whole aggregate image is an operation target on which an editing operation is to be performed.

If it is determined in the step S507 that the instruction for editing the form image has been received (YES to the step S507), the CPU 105 executes a form image-editing process (step S514). In the step S514, the operator can edit the form image by performing a touching operation on the form image of the preview image on the screen shown in FIG. 6C using the touch panel. The form image-editing process in the step S514 will be described in detail hereinafter.

When the form image-editing process in the step S514 is completed by storing an updated form image and updated synthesis settings in the HDD 108, the CPU 105 proceeds to a step S508.

In the step S508, the CPU 105 determines whether or not a print instruction has been received from the operator. In this step, it is determined whether or not a start button or a cancel button, not shown, has been depressed.

If it is determined in the step S508 that no print instruction has been received from the operator, i.e. if the cancel button has been depressed (NO to the step S508), the CPU 105 returns to the step S501.

On the other hand, if it is determined in the step S508 that a print instruction has been received from the operator, i.e. if the start button has been depressed (YES to the step S508), the CPU 105 reads out the form image and the original images from the HDD 108 (step S509), and loads these images into the RAM 106.

Then, the CPU 105 lays out and synthesizes the form image and the original images loaded in the RAM 106 according to the print settings including the N-in-1 settings and the form synthesis settings (step S510). Then, the CPU 105 outputs the synthesized image to the printer engine 102 (step S511), followed by terminating the present process.

Referring again to the step S502, if it is determined in the step S502 that no preview instruction has been received from the operator (NO to the step S502), the CPU 105 determines whether or not a print instruction has been received (step S512). If it is determined in the step S512 that no print instruction has been received from the operator (NO to the step S512), the CPU 105 returns to the step S501.

On the other hand, if it is determined in the step S512 that a print instruction has been received from the operator (YES to the step S512), the CPU 105 scans the originals, stores the scanned original images in the HDD (step S513), and proceeds to the step S509.

Figure 8:
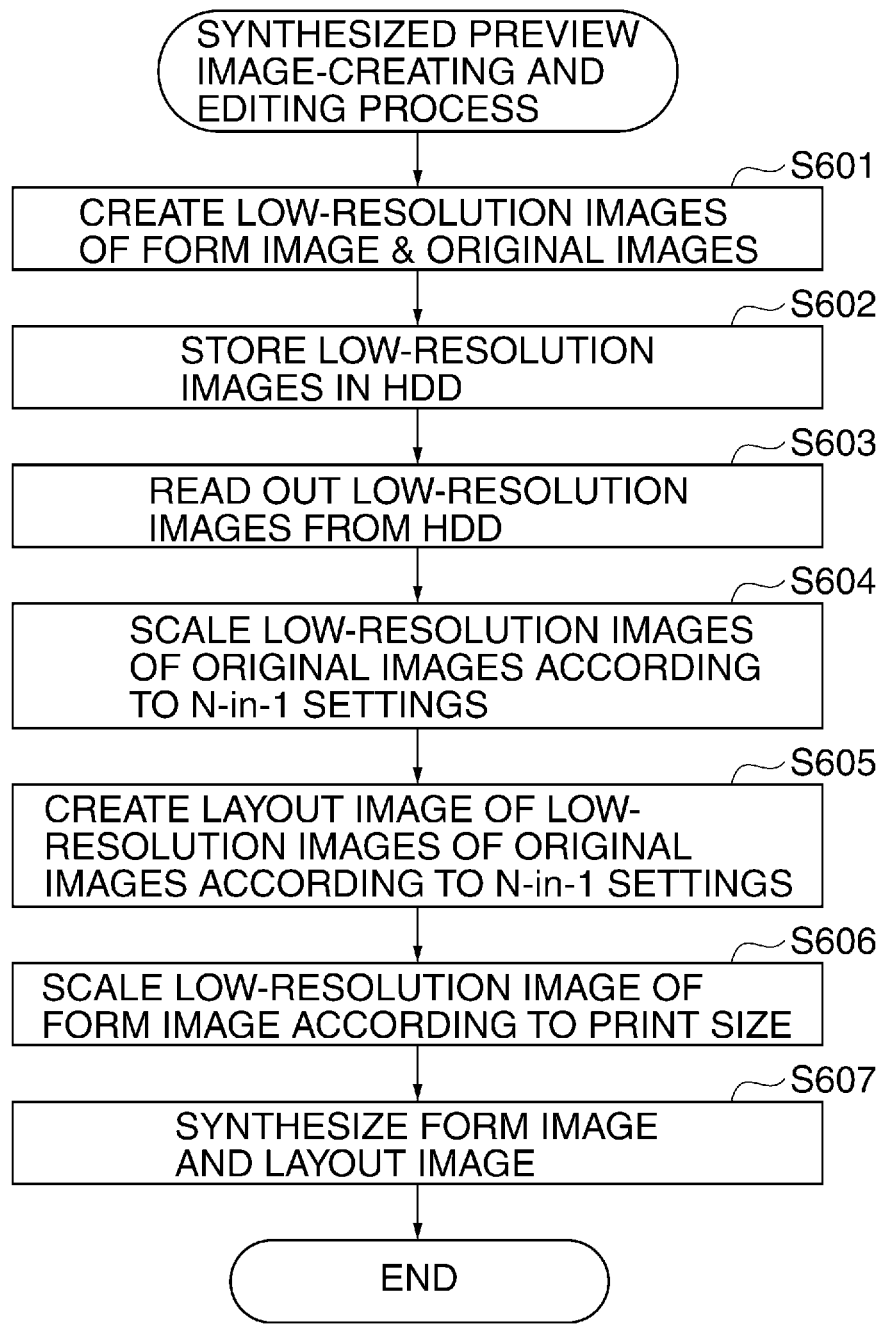
FIG. 8 is a flowchart of a synthesized preview image-creating and editing process executed in a step in FIG. 5.

FIG. 8 is a flowchart of a synthesized preview image-creating and editing process executed in the step S505 in FIG. 5.

Referring to FIG. 8, the CPU 105 creates low-resolution images of the form image and the original images loaded in the RAM 106 in the step S504 (step S601). An original image created by scan processing generally has a resolution of 600 dpi, and hence the images are uniformly converted to images each having a resolution appropriate for preview display (75 dpi in this example).

Then, the created low-resolution images of the form image and the original images are once stored in the HDD 108 (step S602). Then, the CPU 105 reads out the low-resolution images of the form image and the original images, stored in the HDD 108 (step S603), and loads these images into the RAM 106.

Then, the CPU 105 scales the low-resolution images of the original images according to the N-in-1 settings (step S604). More specifically, a scaling ratio of the original images is calculated from the original size, the print size, and the layout number of the N-in-1 settings set by the operator, and performs a scaling process on the low-resolution images of the original images according to the calculated scaling ratio.

For example, when the N-in-1 settings are such that the original size is A4, the print size is A4, and the layout number is 2 (2-in-1), images obtained by reducing the original images with a scaling ratio of 50% in a main scanning direction, and with a scaling ratio 50% in a sub scanning direction are to be laid out. Therefore, the low-resolution images of the original images created for preview display are also scaled according to the scaling ratio of 50% in the main scanning direction, and the scaling ratio of 50% in the sub scanning direction.

Then, a layout image is created according to the N-in-1 settings based on the scaled low-resolution images of the original images (step S605). For example, when the N-in-1 settings are such that the original size is A4, the print size is A4, and the layout number is 2 (2-in-1), the two low-resolution images of the original images created in the step S604 are laid out to form one image after, if necessary, executing rotation processing. The step S605 corresponds to the operation of an aggregate image creation unit configured to create an aggregate image by aggregating a plurality of images on one page.

Then, the low-resolution image of the form image is scaled according to the print size (step S606). Specifically, a scaling ratio of the form image is calculated from the print size and the form image size which is an original size of the form image stored in the HDD 108, and the low resolution image of the form image is scaled according to the calculated scaling ratio.

For example, when the print size is A4, and the form image size is A3, the form image is scaled according to a scaling ratio of 70% in the main scanning direction and a scaling ratio of 70% in the sub scanning direction. Therefore, the low-resolution image of the form image created for preview display in the synthesized preview image-creating and editing process is also scaled according to the scaling ratio of 70% in the main scanning direction and the scaling ratio of 70% in the sub scanning direction.

Then, the preview image of the layout image created in the step S605 and the preview image of the form image created in the step S606 are synthesized (step S607), followed by terminating the present process. The step S607 corresponds to the operation of a first synthesis unit configured to synthesize the aggregate image created by the aggregate image creation unit and a form image.

Figure 9:
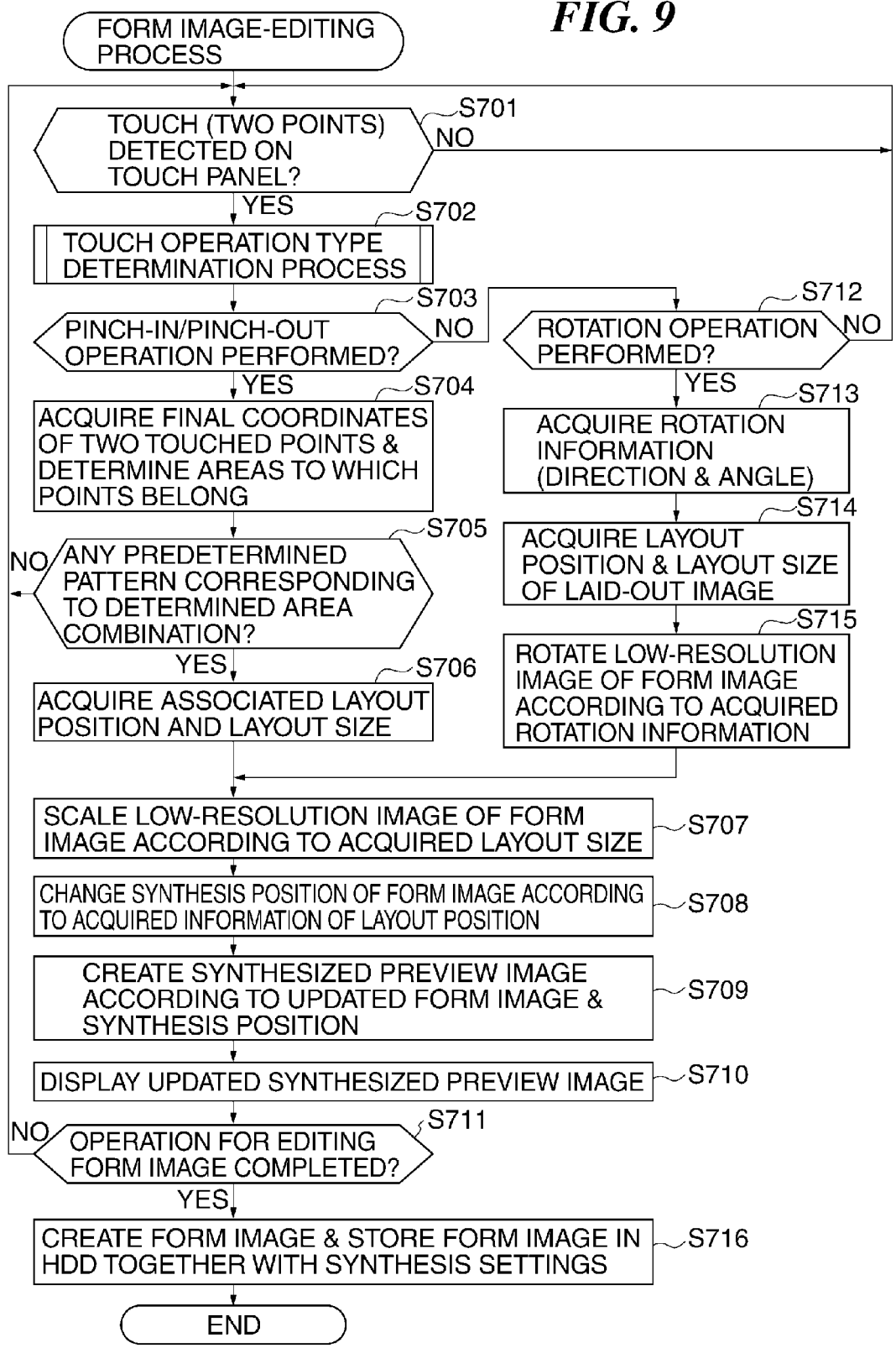
FIG. 9 is a flowchart of a form image-editing process executed in a step in FIG. 5.

FIG. 9 is a flowchart of the form image-editing process executed in the step S514 in FIG. 5.

Referring to FIG. 9, if touching on the touch panel is detected by the console section 110 (YES to the step S701), the CPU 105 performs a touch operation type determination process (step S702). Note that detection of touching in the step S701 is two point-touch detection, i.e. detection of touches at two points. The touch operation type determination process will be described hereinafter.

Then, the CPU 105 determines whether or not a pinch-in/pinch-out operation has been performed (step S703). If it is determined in the step S703 that a pinch-in/pinch-out operation has been performed (YES to the step S703), coordinates of final two touch-detected points are acquired, and respective areas to which the touch-detected points belong are determined (step S704).

The process in the step S704 will be described in detail. First, FIGS. 10A and 10B are diagrams each showing a preview display screen on the console section 110 appearing in FIG. 2.

Figure 10A:
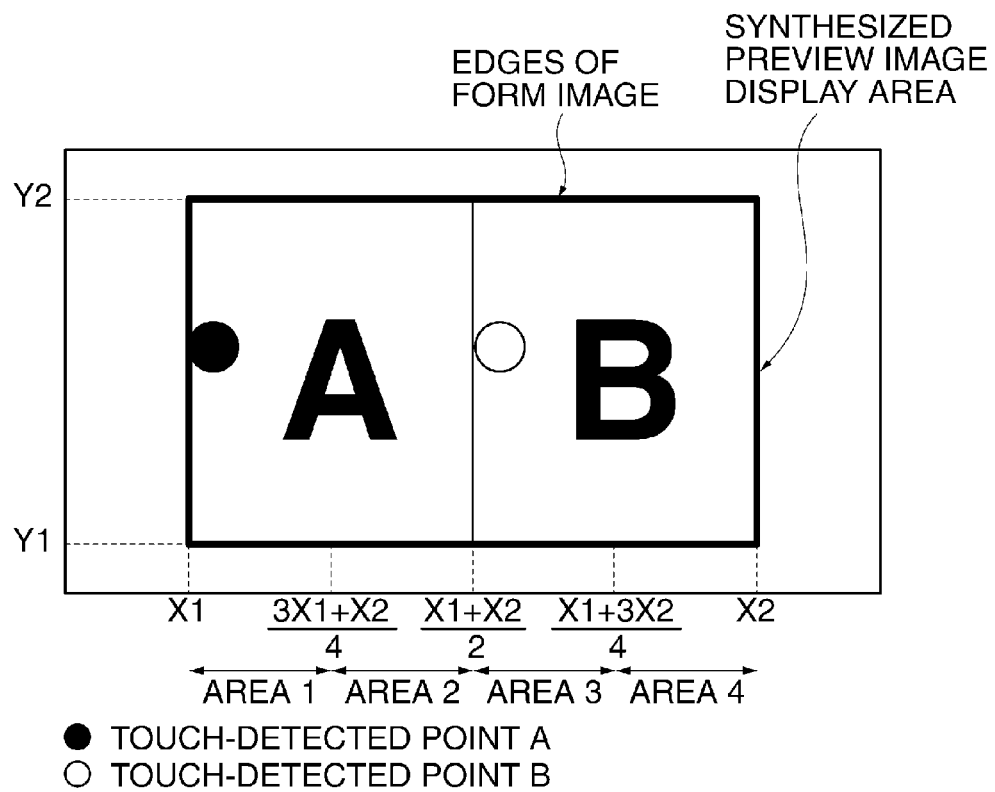
FIGS. 10A and 10B are diagrams each showing a preview display screen on the console section appearing in FIG. 2.
Figure 10B:
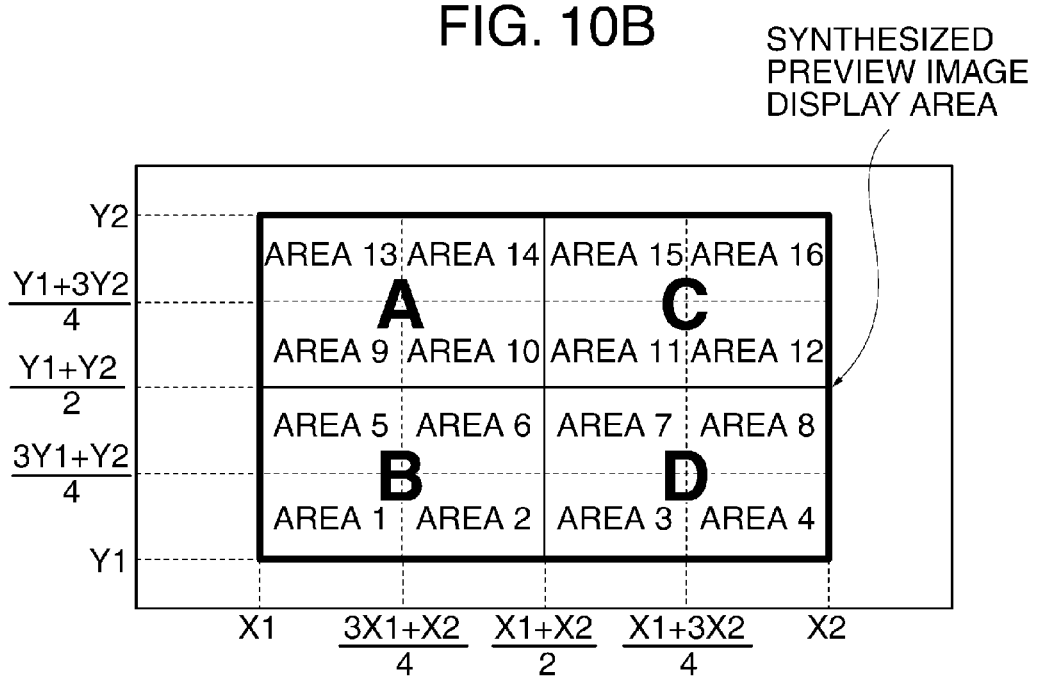

FIG. 10A shows the preview display screen displayed when 2-in-1 is designated.

A coordinate system shown in FIG. 10A represents a two-dimensional area in which from the origin at the lower left corner, a distance in the right direction is defined as an X-coordinate and a distance in the upper direction is defined as a Y-coordinate.

The synthesized preview image area is an area surrounded by predetermined four points (X1, Y1), (X1, Y2), (X2, Y1), and (X2, Y2).

An X coordinate of the boundary between an image area of A and an image area of B which are arranged in 2-in-1 is (X1+X2)/2, as shown in FIG. 10A. An X coordinate of a mid point in the image area of A is (3X1+X2)/4, as shown in the same. An X coordinate of a mid point in the image area of B is (X1+3X2)/4, as shown in the same.

For example, the synthesized preview image display area is uniformly divided into areas from the coordinates calculated as above, whereby X coordinate position indicative of each of area 1 to area 4 are defined. In the step S704, to which of the area 1 to area 4 the two touched points belong are determined.

For example, it is determined that the two touch-detected points A and B in FIG. 10A belong to the area 1 and the area 3, respectively.

FIG. 10B shows the preview display screen displayed on the console section 110 when 4-in-1 is designated.

Similar to the case of designation of 2-in-1, respective areas in FIG. 10B in the case of designation of 4-in-1 to which belong two touch-detected points are also determined. However, in the case of designation of 4-in-1, the areas are determined also based on coordinates in the Y direction. Note that the method of calculating a threshold value (value indicative of a boundary between areas) is described above only by way of example, but not limited to this.

Referring again to FIG. 9, it is determined whether or not a combination of the determined areas corresponds to a predetermined pattern (step S705). More specifically, it is determined whether or not a combination of the areas to which belong the two touch-detected points, determined in the step S704, corresponds to any of predetermined patterns set according to the layout number of N-in-1 and areas where the form image is currently synthesized.

The above-mentioned combination pattern will be described. FIGS. 11A and 11B are diagrams showing predetermined patterns, in which FIG. 11A shows a pattern table used when 2-in-1 is designated as shown in FIG. 10A, and FIG. 11B shows a pattern table used when 4-in-1 is designated as shown in FIG. 10B.

In the case of the above-described example, the form synthesis setting is applied to the whole area of the print size, and hence in FIG. 11A, the patterns for comparison are patterns other than a pattern in which the area designation designates a area to which the form synthesis setting is currently applied. Therefore, the patterns for comparison in the preset case are the patterns 1, 2, 4, and 5.

Assuming that the area to which the form synthesis setting is currently applied is the image area of A, the patterns for comparison would be the pattern 3, 4, and 5.

Further, the touch-detected point A belongs to the area 1, and the touch-detected point B belongs to the area 3 in FIG. 10A, and hence this combination pattern corresponds to the pattern 2 in FIG. 11A.

Referring again to FIG. 9, if it is determined in the step S705 that the combination of the determined areas do not correspond to any predetermined pattern (NO to the step S705), the CPU 105 returns to the step S701.

On the other hand, if it is determined in the step S705 that the combination of the calculated areas corresponds to one of the predetermined patterns (YES to the step S705), a layout position and a layout size associated therewith are acquired (step S706).

For example, in the case of FIG. 10A, the combination of the determined areas corresponds to the pattern 2, and hence it is determined that the area which the operator desires to designate is the image area of A in FIG. 10A. Therefore, information indicating the image area of A as the layout position, and the size of the image area of A, which is half the synthesized preview image display area, as the layout size is acquired.

Then, the low-resolution image of the form image is scaled according to the layout size acquired in the step S706 (step S707). For example, when the area to which the form image synthesis is currently applied is the whole area of the synthesized preview image display area and the layout size acquired in the step S706 is the size of the image area of A, the low-resolution image of the form image is reduced with a scaling ratio of 50% in the main scanning direction.

Next, the position where the low-resolution image of the form image is to be synthesized is changed according to the layout position acquired in the step S706 (step S708). Then, the synthesized preview image is created using the low-resolution image of the form image scaled in the step S707 and according to the synthesized position changed in the step S708 (step S709). The step S709 corresponds to the operation of a second synthesis unit configured, when it is determined that the operation performed by the operator is a first operation, to synthesize the form image with a changed image after scaling the form image to the size of the changed image.

Then, the synthesized preview image created in the step S709 is displayed on the console section 110 (step S710). The step S710 corresponds to the operation of a second display control unit configured to control the display unit to display an image synthesized by the second synthesis unit or a third synthesis unit.

Then, it is determined whether or not the operation for editing the form image has been completed (step S711). This is determined by determining whether or not a form image edit termination button 907 appearing in FIG. 6C has been depressed.

If it is determined in the step S711 that the operation for editing the form image has not been completed (NO to the step S711), the CPU 105 returns to the step S701, whereas if the operation has been completed (YES to the step S711), a form image updated based on the settings of the preview image is created, and the created form image and the settings of synthesis of the original image and the form image are stored in the HDD (step S716), followed by terminating the present process.

Referring again to the step S703, if it is determined therein that a pinch-in/pinch-out operation has not been performed (NO to the step S703), it is determined whether or not a rotation operation has been performed (step S712).

If it is determined in the step S712 that a rotation operation has not been performed (NO to the step S712), the CPU 105 returns to the step S701.

On the other hand, if it is determined in the step S712 that a rotation operation has been performed (YES to the step S712), rotation information indicative of a direction of rotation and an angle of rotation through which the form is to be rotated is acquired (step S713). Then, the layout position and the layout size of a laid out image to which the current form image is applied are acquired (step S714).

Then, the low-resolution image of the form image is rotated according to the acquired rotation information (step S715). Then, the low-resolution image of the form image is scaled according to the size of the rotated low-resolution image of the form image and the layout size acquired in the step S714 (step S707).

Then, the position where the form image is to be synthesized is changed according to the layout position acquired in the step S714 (step S708), and the CPU 105 proceeds to the step S709. The step S709 corresponds to the operation of the third synthesis unit configured, when it is determined that the operation performed by the operator is a second operation, to synthesize the form image with the image as an operation target by the operator after rotating the form image and scaling the form image to the size of the image as the operation target.

Note that the synthesizing position where the form image is to be synthesized is not changed when the rotation operation is performed, and there is no change in the synthesized position between before and after the change caused by execution of the step S708.

The steps S703 and S712 correspond to the operation of a determination unit configured to determine whether the operation performed by the operator is the first operation for changing the image with which the form image is to be synthesized from the image as the current operation target by the operator to one of the plurality of images included in the aggregate image or the whole aggregate image, or the second operation for rotating the form image synthesized with the image as the current operation target by the operator. Further, as mentioned hereinabove, the first operation is the pinch-in or pinch-out operation on the touch panel, and the second operation is the rotation operation on the same.

FIG. 12 is a flowchart of the touch operation type determination process executed in the step S702 in FIG. 9.

Figure 13:
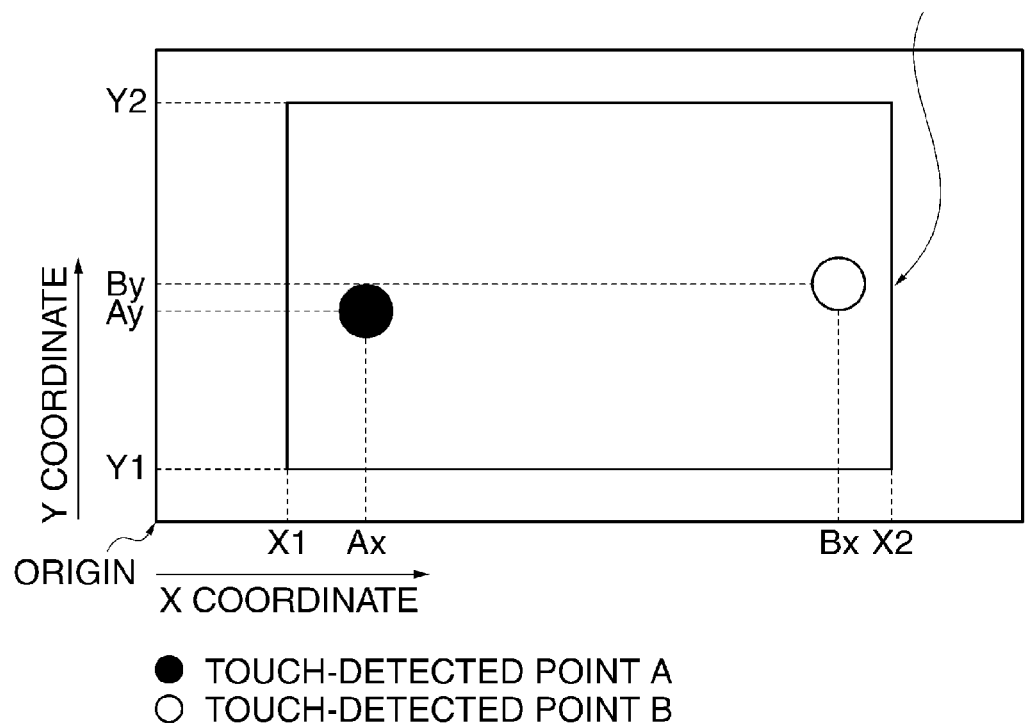
FIG. 13 is a diagram showing an example of a coordinate system for touch-detected points.

Referring to FIG. 12, the coordinates of the two touch-detected points are acquired (step S801). Acquisition of the coordinates of touch-detected points will be described. FIG. 13 is a diagram showing a coordinate system for touch-detected points. The coordinate system for touch-detected points corresponds to an area on which the preview image is displayed in FIG. 6C.

In the coordinate system for touch-detected points shown in FIG. 13, from the origin at the lower left corner, a distance in the right direction is defined as an X-coordinate and a distance in the upper direction is defined as a Y-coordinate. The console section 110 acquires the coordinates of the two points touched by the operator for a form image-editing operation. In the illustrated example in FIG. 13, the coordinates (Ax, Ay) of the touch-detected point A and the coordinates (Bx, By) of the touch-detected point B are acquired.

When the coordinates of the two touch-detected points are acquired as above, it is determined whether or not the coordinates of the two touch-detected points have been changed (step S802). In this step, this determination is made by determining whether or not the coordinates of the two touch-detected points acquired in the step S801 are the same as the current coordinates of the two touch-detected points. Further, even in a case where the coordinates of one of the two touch-detected points have been changed, it is determined that the coordinates of the two touch-detected points have been changed.

If it is determined in the step S802 that the coordinates of the two touch-detected points have not been changed (NO to the step S802), the CPU 105 proceeds to a step S804.

On the other hand, if it is determined in the step S802 that the coordinates of the two touch-detected points have been changed (YES to the step S802), the coordinates of the two touch-detected points are acquired again (step S803). Then, it is determined whether or not the number of the touch-detected points detected on the touch panel is smaller than two (step S804).

If it is determined in the step S804 that the number of the touch-detected points detected on the touch panel is not smaller than two (NO to the step S804), the CPU 105 returns to the step S802.

On the other hand, if it is determined in the step S804 that the number of the touch-detected points detected on the touch panel is smaller than two (YES to the step S804), a movement path along which the two touch-detected points have moved is calculated from a plurality of sets of the coordinates acquired thus far for the current operation (step S805). Then, a type of the operation performed on the touch panel is determined from the calculated movement path (step S806), followed by terminating the present process.

Calculation of the movement path in the step S805 will be described. FIGS. 14A to 14D are diagrams showing examples of the movement path on the touch panel.

In the step S805, a movement path represented e.g. by one of patterns shown in FIGS. 14A to 14D is calculated. Then, in the step S806, a type of the operation performed on the touch panel is determined from the calculated movement path.

Figure 14A:
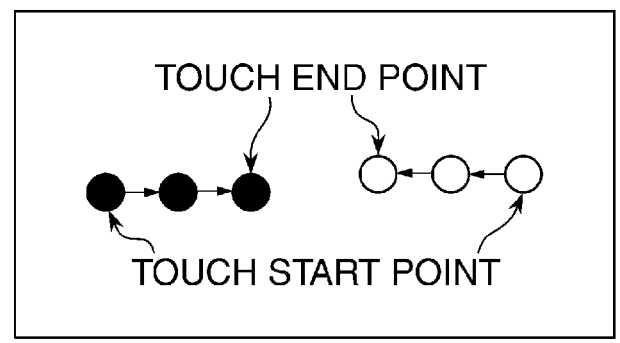
FIGS. 14A to 14D are diagrams showing patterns of a movement path.
Figure 14B:
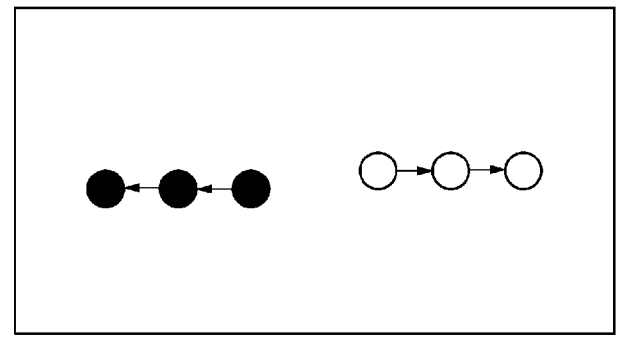
Figure 14C:
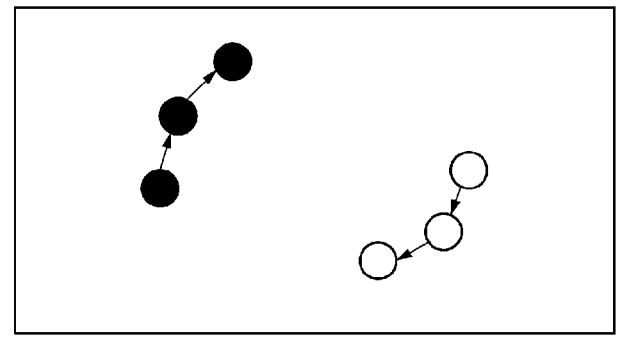

For example, movement paths shown in FIGS. 14A and 14B are each indicated by a straight line in the X-coordinate direction. In a case where the two touch-detected points have moved linearly (in a straight line) as shown in FIGS. 14A and 14B, it is determined that the type of the operation is the pinch-in or pinch-out operation.

As shown in FIG. 14A, in a case where the distance between the two touch-detected points becomes smaller, it is determined that the type of the operation is the pinch-in operation, and as shown in FIG. 14B, in a case where the distance between the two touch-detected points becomes larger, it is determined that the type of the operation is the pinch-out operation.

Figure 14D:
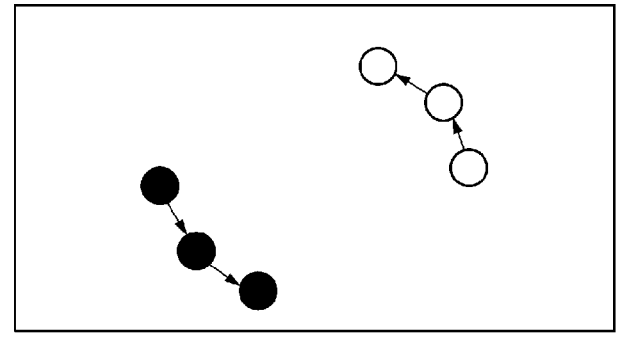

Further, in a case where the two touch-detected points have moved nonlinearly (in a curved manner) as shown in FIG. 14D, it is determined that the type of the operation is the rotation operation. When it is determined that the type of the operation is the rotation operation, a direction of rotation and an angle of rotation through which the form is to be rotated is calculated e.g. from the center of the distance between the two touch-detected points, and a start point and an end point of each of the two touch-detected points.

Note that the direction of rotation determined in this step is a clockwise direction or an anticlockwise direction, and the calculated angle of rotation is one of 0 degree, 90 degrees, and 180 degrees. Although the angle of rotation just calculated from the touch-detected points is likely to be none of the above-mentioned angles, in such a case, the angle is rounded to one of the above-mentioned angles.

For example, in a case where the angle is rounded by setting intermediate angles between the above-mentioned angles as threshold values (45 degrees and 135 degrees), if the angle is calculated as 50 degrees, the angle is rounded to 90 degrees, whereby the 90 degrees is set as a calculation result by regarding the 50 degrees as 90 degrees.

According to the above-described process, the operation for editing the preview image performed on the console section 110 is determined. However, the present process is only an example, and hence any other process may be employed in place of this process insofar as it can give the same result.

Now, an example of the above-described operation for editing the form image will be described with the example of an operation performed by the operator with reference to FIGS. 6A to 6C, 15A to 15C, 16A, and 16B each showing a screen displayed on the console section 110. FIGS. 15A to 15C, and 16A and 16B are diagrams showing examples of the screen displayed on the console section 110. Further, the following description is given of an operation performed by the operator for editing the form image such that an image as shown in FIG. 16B is displayed, by way of example.

First, on the screen shown in FIG. 6A, the operator configures the 2-in-1 settings of and the form synthesis settings, as described above, and depresses the preview read button 904. This causes the console section 110 to display the preview image as shown in FIG. 6B.

Then, the operator depresses the image edit button 906 appearing in FIG. 6B. This causes the console section 110 to display the preview image shown in FIG. 6C which enables the operator to clearly recognize the form image. In the illustrated display example of FIG. 6C, edges of the form image are emphasized.

On the screen shown in FIG. 6C, the operator touches right and left ends of the form image and perform the rotation operation for rotating the image by 90 degrees in the clockwise direction, by an associated one of the touch operations described above. This causes the console section 110 to display the preview image shown in FIG. 15A in which the form image rotated clockwise by 90 degrees is synthesized.

The operator further touches the right and left ends of the form image to thereby perform the pinch-in operation by an associated one of the touch operations described above. This causes the console section 110 to display the preview image shown in FIG. 15B in which the form image is applied to the image area of A alone. In this case, the image area of A is the operation object.

Figure 15A:
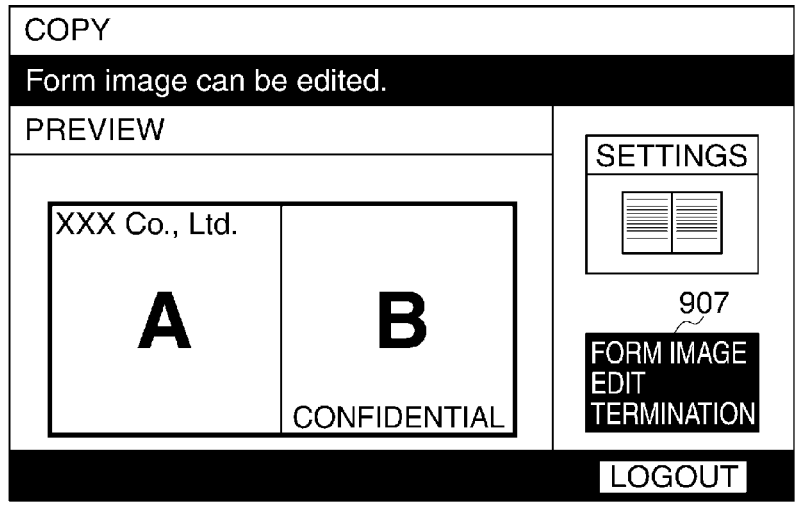
FIGS. 15A to 15C are diagrams showing examples of a screen displayed on the console section appearing in FIG. 2.
Figure 15B:
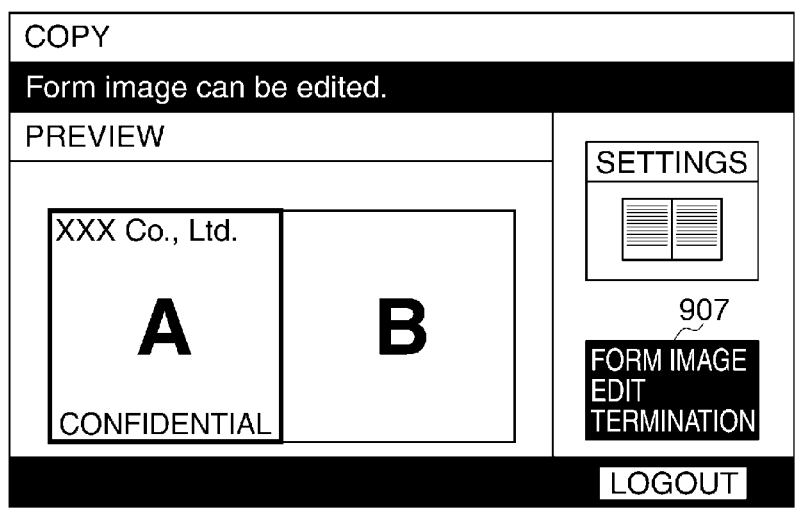
Figure 15C:
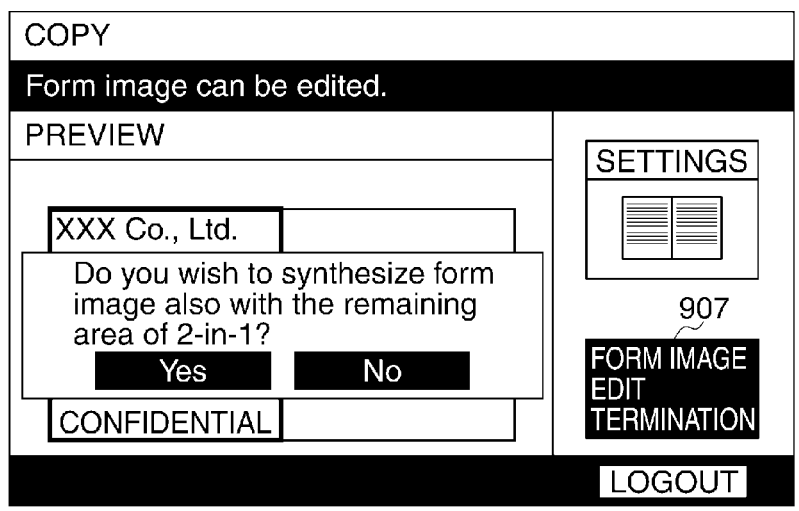

If an operation for applying the form image provided in advance for the whole print size to a single image area of the N-in-1 layout is performed, the CPU 105 inquires of the operator about whether or not to synthesize the form image also with the rest of the areas of the N-in-1 layout, as in FIG. 15C.

Figure 16A:
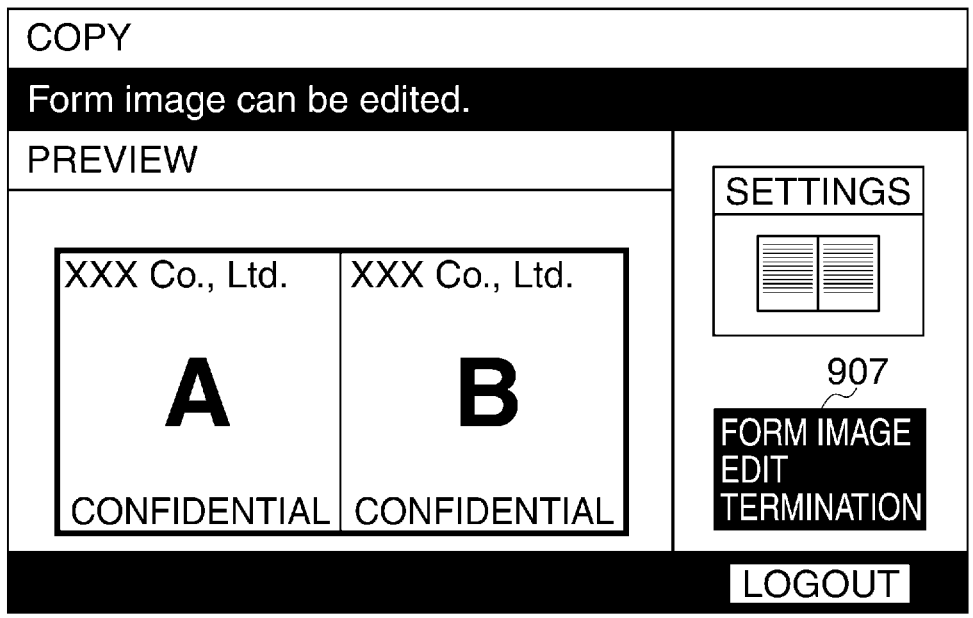
FIGS. 16A and 16B are diagrams showing examples of a screen displayed on the console section appearing in FIG. 2.
Figure 16B:
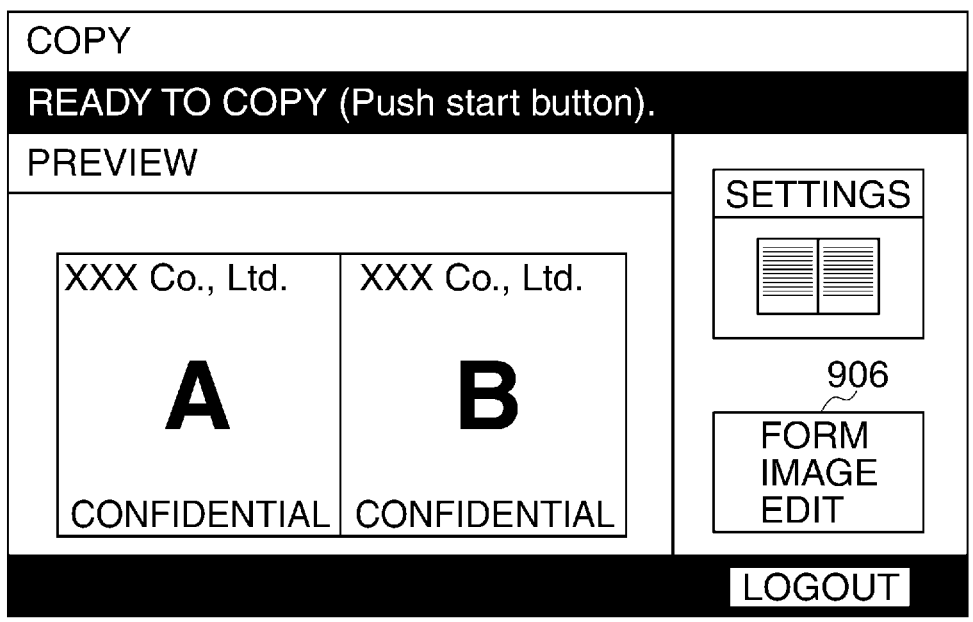

If the operator selects "Yes", the preview image, shown in FIG. 16A, in which the same form image is synthesized with the rest of the areas of the N-in-1 layout is displayed. As described above, in the present embodiment, it is possible to synthesize the form image after scaling the same, also with each of the other images included in the aggregate image than the image set as the operation target by the first operation.

After judging that the settings have been configured as intended, the operator depresses the form image edit termination button 907 appearing in FIG. 16A to thereby terminate the operation for editing the form image.

As a consequence, the console section 110 displays a screen indicating a copy-executable state, as shown in FIG. 16B. Note that in the above-described operation for editing the form image, the layout image in which the original images are arranged according to the N-in-1 layout as shown in FIGS. 6A to 6C remains unmoved without being influenced by the operation.

In the operation described above with reference to FIGS. 6C, 15A to 15C, and 16A, the form image synthesized with the whole print size area is rotated clockwise by 90 degrees, and is scaled to half of the print size. The scaled form image is copied and synthesized with the other area of the 2-in-1 layout, whereby the preview result shown in FIG. 16A is obtained.

As for creation of a form image, a new (modified) form image is created by executing the processing performed on the low-resolution image of the form image in the preview operation, on the form image. The processing performed on the low-resolution image of the form image is processing corresponding to the steps S701 to S715 of the form image-editing process shown in FIG. 9. Processing for creating a new (modified) form image, mentioned above, is executed in the step S716 of the form image-editing process, and the created form image is stored in the HDD 108, and is read out from the HDD 108 together with the original images in the step S509 in the synthesis process in FIG. 5.

For example, let it be assumed, similar to the example described with reference to FIGS. 6A to 6C, a case in which a form image having a A4R size is synthesized with images arranged according to the 2-in-1 settings configured such that the print size is A4 and the original size is A4. In this case, a form image having a A5 size is created by rotating the A4R-size form image clockwise by 90 degrees and reducing the form image with a scaling ratio of 50% in the main scanning direction, and two images of the thus created form image are laid out so as to obtain an image having a A4 size, whereby a form image is created in accordance with an instruction for editing the form image. The created new form image is synthesized with the layout image obtained by laying out the originals according to the N-in-1 settings.

As described above, in the present embodiment, the preview function is executed when N-in-1 and form synthesis are designated, and an instruction for editing, such as layout, is given by performing a touch operation on the form image displayed for preview, whereby it is made possible to execute editing and setting of a desired form image adapted to the N-in-1 settings.

Further, a form image adapted to the N-in-1 settings is created from a form image designated in advance according to an instruction for editing the form image, whereby it is made possible for the operator to perform configuration of settings and execution of printing only if one form image has been made available in advance.

According to the above-described embodiment, an aggregate image is created by aggregating a plurality of images on one page, the created aggregate image and a form image are synthesized, and the display unit is controlled to display the synthesized image. Further, it is determined whether the operation performed by the operator is the first operation for changing the image with which the form image is to be synthesized from an image as the current operation target by the operator to one of the plurality of images included in the aggregate image or the whole aggregate image, or the second operation for rotating the form image synthesized with the image as the current operation target by the operator. If it is determined that the operator's operation is the first operation, the form image is scaled to the size of the changed image, and is synthesized with the changed image. On the other hand, if it is determined that the operator's operation is the second operation, the form image is rotated and scaled to the size of the image as the operation target by the operator, and is synthesized with the image as the operation target, and hence the form image can be synthesized with the aggregate image created by aggregating the plurality of images in one page.

Next, a first variation of the present embodiment will be described. In the above-described embodiment, an instruction for editing a form image which the operator desires to synthesize with an N-in-1 layout is carried out by executing processing, such as rotation and/or scaling, on one form image. However, when scaling the form image, if there is a large difference between the scaling ratio in the main scanning direction and that in the sub scanning direction, the resulting form image may be largely degraded from the form image designated in advance.

In the first variation, a portrait image (having e.g. an A4 size) and a landscape image (having e.g. an A4R size) are registered in advance. Further, a process for scaling a form image is executed provided that group registration or the like has been performed so as to cause the image processing apparatus 50 to recognize that the form images are of the same pattern. The following description is given to explain the scaling process.

Figure 17:
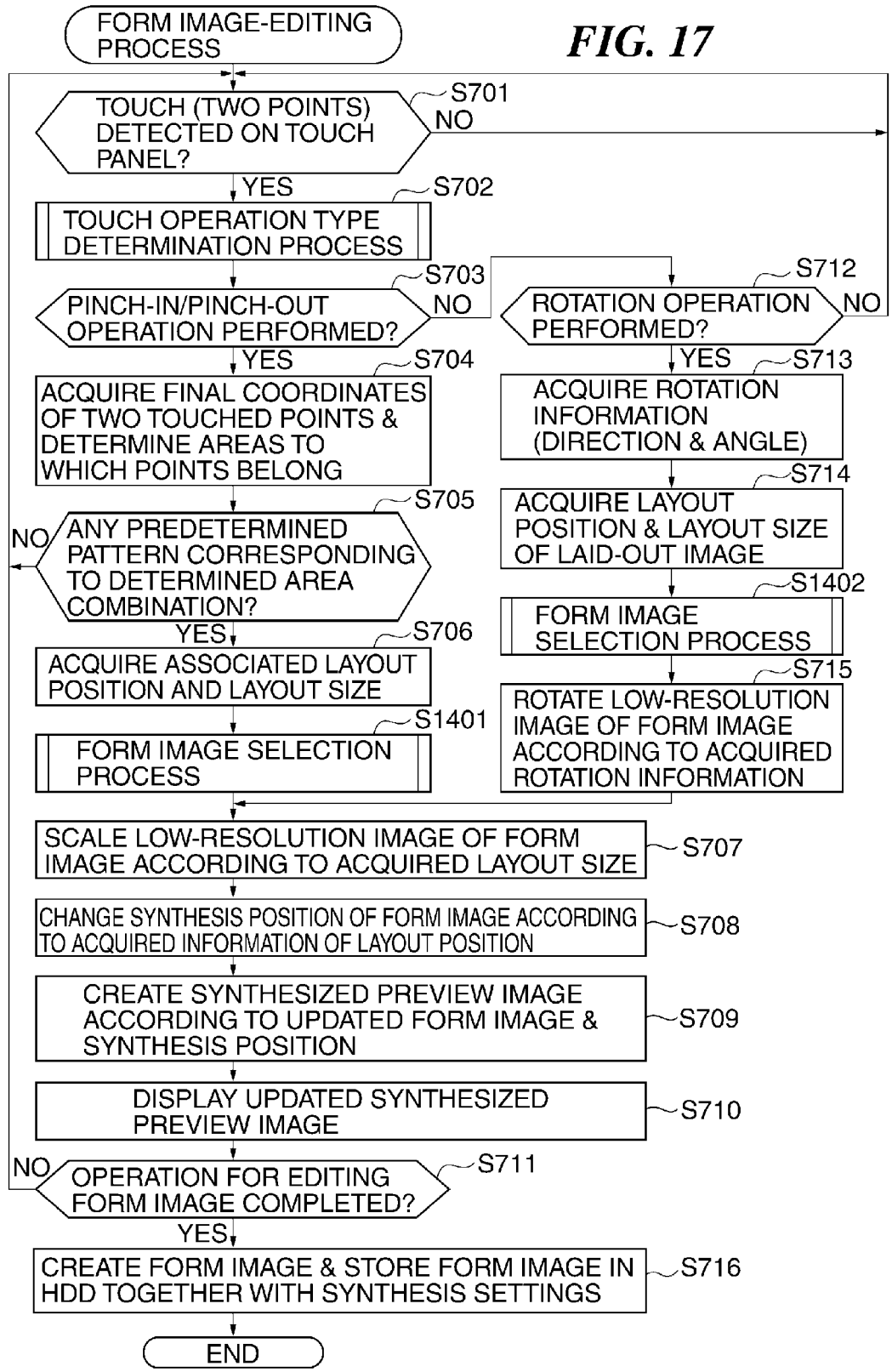
FIG. 17 is a flowchart of a form image-editing process executed in the step in FIG. 5 by a first variation of the present embodiment.

FIG. 17 is a flowchart of the form image-editing process executed in the step S514 in FIG. 5 by the first variation.

The flowchart in FIG. 17 is modified from the flowchart in FIG. 9 by adding a step S1401 between the steps S706 and S707, and adding a step S1402 between the steps S714 and S715.

Further, the same steps as those in FIG. 9 are denoted by the same step numbers so as to make distinct differences from the flowchart in FIG. 9, and description of the same steps is omitted.

Referring to FIG. 17, after execution of the step S706, a form image selection process for selecting a form image to be edited based on the layout size is executed (step S1401). The form image selected in the step S1401 is scaled and synthesized in the steps S707 to S709.

Similarly, after execution of the step S714, the form image selection process for selecting a form image to be edited based on the layout size is executed (step S1402). The form image selected in the step S1402 is rotated, scaled, and synthesized in the steps S715, and S707 to S709.

Figure 18:
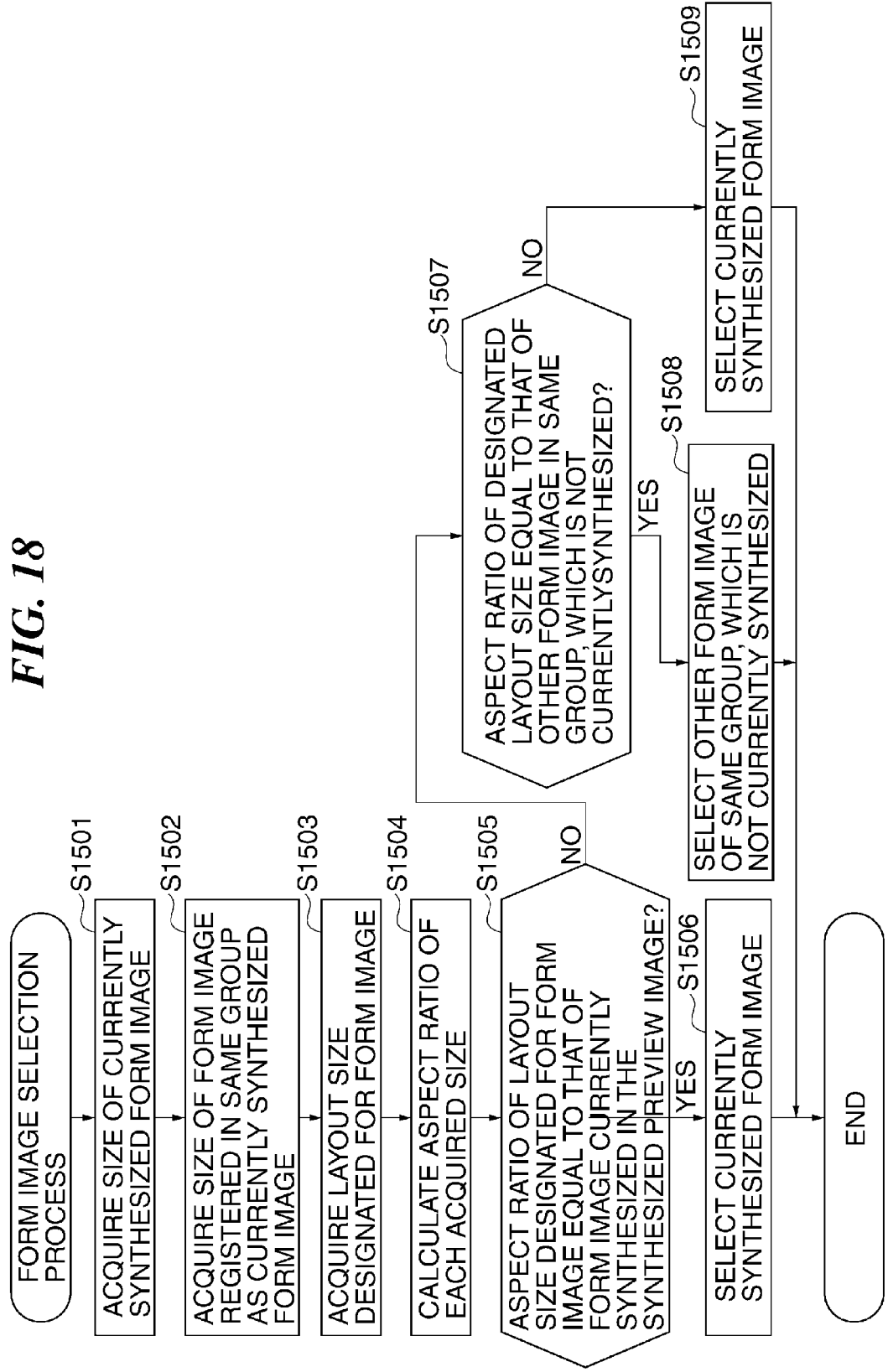
FIG. 18 is a flowchart of a form image selection process executed in steps in FIG. 17 by the first variation.

FIG. 18 is a flowchart of the form image selection process executed in the steps S1401 and S1402 in FIG. 17.

Referring to FIG. 18, the size of the form image currently synthesized in the synthesized preview image is acquired (step S1501). The size of the other form image registered in advance in the same group as the form image currently synthesized in the synthesized preview image is acquired (step S1502).

Then, a layout size, designated on the console section 110, for a form image is acquired (step S1503). Aspect ratios of the respective sizes acquired in the steps S1501 to S1503 are calculated (step S1504).

It is determined whether or not an aspect ratio of the layout size designated for a form image is equal to that of the form image currently synthesized in the synthesized preview image (step S1505).

For example, assuming that the form images registered in the same group are an A4-size image and an A4R-size image, the aspect ratio of the A4 size is 7:5, and the aspect ratio of the A4R size is 5:7. Further, when the 2-in-1 settings are such that the original size is A4, the print size is A4, and the image area of A is designated as the layout position, the designated layout size is A5 and the aspect ratio thereof is 7:5.

Therefore, in the above-mentioned case, if the currently synthesized form image is the A4-size form image, it is determined that the aspect ratio of the designated layout size is equal to that of the currently synthesized form image.

If it is determined in the step S1505 that the aspect ratios are equal (YES to the step S1505), the currently synthesized form image is selected as an image for being edited (step S1506), followed by terminating the present process.

On the other hand, if it is determined in the step S1505 that the aspect ratios are not equal (NO to the step S1505), it is determined whether or not the aspect ratio of the designated layout size is equal to that of the other form image in the same group, which is not currently synthesized (step S1507).

In a case where the currently synthesized form image is an A4R-size image, it is determined in the determination in the step S1505 that the aspect ratios are not equal, and it is determined in the step S1507 that the aspect ratios are equal.

If it is determined in the step S1507 that the aspect ratios are equal (YES to the step S1507), the other form image in the same group, which is not currently synthesized, is selected as an image for being edited (step S1508), followed by terminating the present process.

On the other hand, if it is determined in the step S1507 that the aspect ratios are not equal (NO to the step S1507), the currently synthesized form image is selected as an image for being edited (step S1509), followed by terminating the present process.

As described above, in the present embodiment, there are two form images provided in advance which are different from each other only in that a longitudinal length of one form image is a transverse length of the other form image, and a transverse length of the one form image is a longitudinal length of the other form image, and out of the two form images, one having an aspect ratio equal to that of an image to be synthesized is used for synthesis.

As described above, in the first variation, a form image to be used as a form is changed according to an instruction for editing the form image. This makes it possible to solve the problem of image degradation in the embodiment. Although in the first variation, two form images of the same group are registered in advance, three or more form images of the same group may be registered.

Next, a second variation of the present embodiment will be described. Although in the embodiment and the first variation, description has been given of the examples of configuration processing assuming that N-in-1 and form synthesis are designated, in both of the examples, the layout sizes of originals and forms are assumed to be regular ones. However, the image processing apparatus 50 has a function called "image repeating".

The image repeating function is a function of setting an image of a desired size as a repeat image, and printing an image created by repeatedly copying the repeat image and arranging the repeat images within the limit of an area of the print size. In the image repeating function, each repeat image has an irregular size.

In the second variation, in view of the characteristics of the image repeating function, a process for editing a form image during execution of image repeating and form synthesis will be described.

The process for editing a form image in the second variation is basically similar to the process for editing a form when N-in-1 and form synthesis are designated, described in the embodiment, and hence only different points will be described.

Figure 19A:
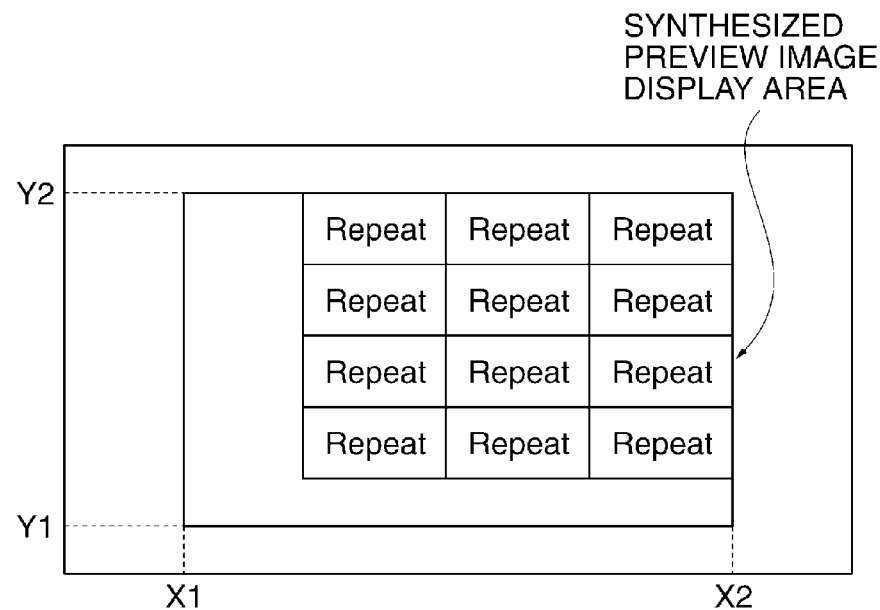
FIGS. 19A and 19B are diagrams useful in explaining an area displayed execution of image repeating by a second variation of the embodiment.
Figure 19B:
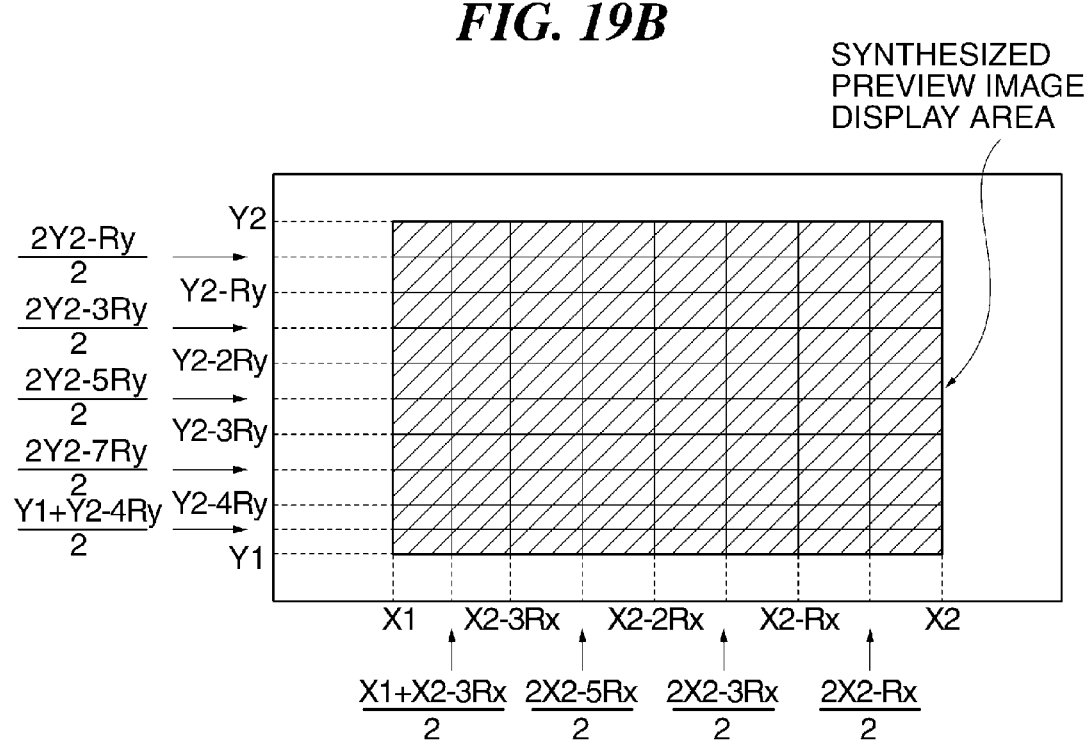

FIGS. 19A and 19B are diagrams showing examples of areas displayed during execution of image repeating, in which FIG. 19A shows an example of display of repeat images, and FIG. 19B shows an example of the synthesized preview image display area.

In the step S704 in the above-described embodiment, the area determination is performed in accordance with the N-in-1 settings.

In contrast, in the second variation, as shown in FIG. 19A, image repeating is executed whereby the repeat images of the irregular size are repeatedly disposed. Further, the repeat images are arranged starting from an upper right corner in the synthesized preview image display area shown in FIG. 19A.

When image repeating is designated, areas shown in FIG. 19B are calculated so as to determine where to adapt the form image, on a repeat image basis. In the illustrated example in FIG. 19B, the size of the repeat image and the coordinate system of the synthesized preview image display area are known, and hence the coordinates of each area as shown in FIG. 19B are calculated based on the known information.

Note that although in the second variation, for boundary conditions for use in determining each area, there are used boundaries between the repeat images, lines indicative of respective centers of the repeat images, and boundaries of the synthesized preview image display area, this is not limitative.

Each touched area is determined by comparing the coordinates between each of these areas and a touch-detected point. When the touched areas are determined, the pattern determination in the step S705 is performed by comparing the determined areas with a pattern table in image repeating. The pattern table in image repeating is based on the same idea based on which are formed the examples of the pattern tables for 2-in-1 and 4-in-1 described in the embodiment, and hence description thereof is omitted.

Figure 20:
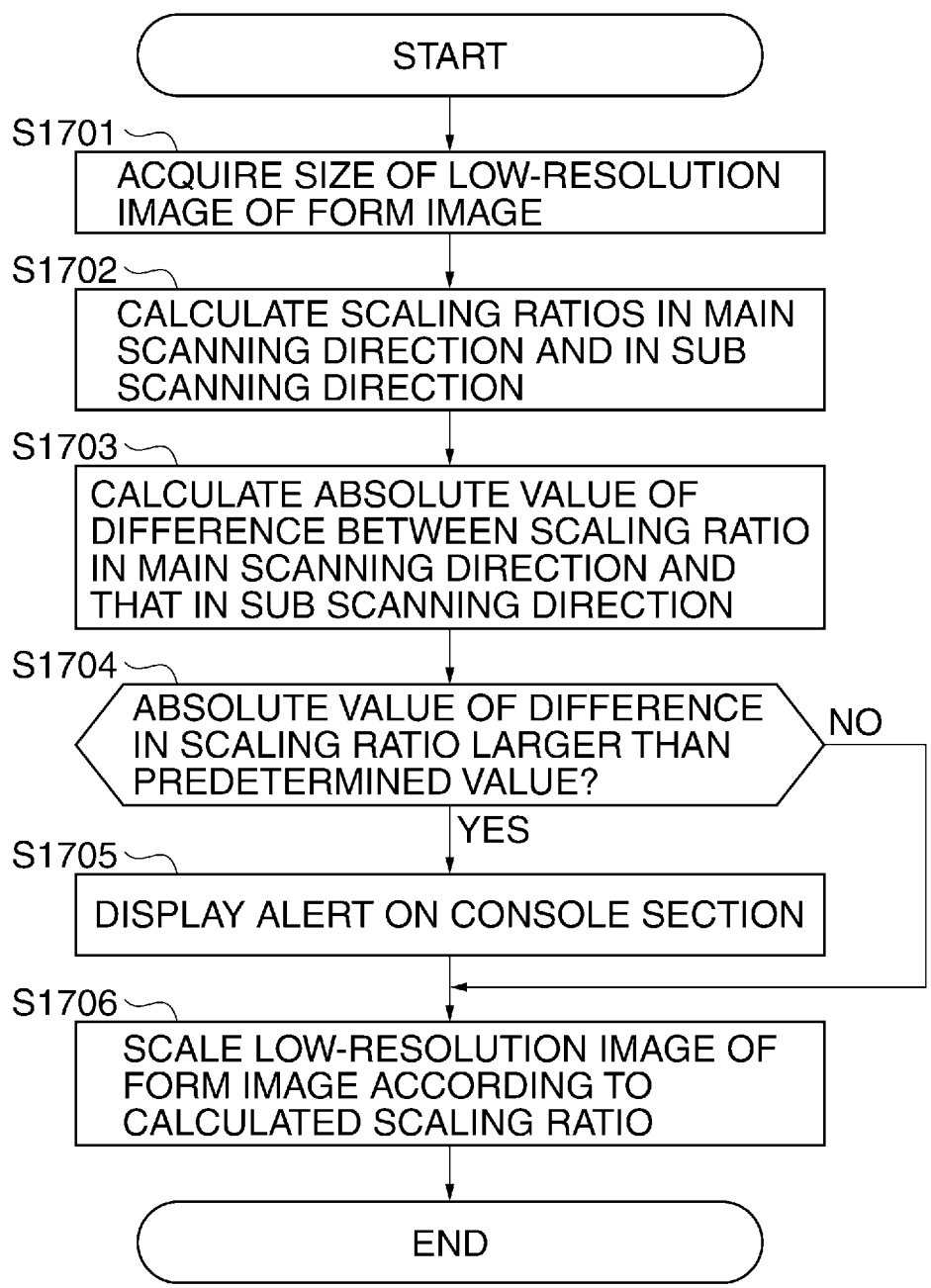
FIG. 20 is a flowchart of a process executed in a step in FIG. 9 by the second variation.

FIG. 20 is a flowchart of the process executed in the step S707 in FIG. 9 according to the second variation.

Referring to FIG. 20, the size of the low-resolution image of the form image for preview is acquired (step S1701). The scaling ratios in the main scanning direction and the sub scanning direction are calculated from the layout size of the form image acquired in advance before execution of the step S1701 and the size of the low-resolution image of the form image for preview acquired in the step S1701 (step S1702).

Then, the absolute value of a difference between the scaling ratio in the main scanning direction and the scaling ratio in the sub scanning direction, calculated in the step S1702, is calculated (step S1703). Then, it is determined whether or not the absolute value of the difference in scaling ratio calculated in the step S1703 is larger than a predetermined value (step S1704). Note that the predetermined value may be configured to have a default value set e.g. to 50, and be changeable for each image processing apparatus.

If it is determined in the step S1704 that the absolute value of the difference in scaling ratio is not larger than the predetermined value (NO to the step S1704), the CPU 105 proceeds to a step S1706.

On the other hand, if it is determined in the step S1704 that the absolute value of the difference in scaling ratio is larger than the predetermined value (NO to the step S1704), an alert to the effect that the form image is largely degraded by scaling the form image is displayed on the console section 110 (step S1705). This enables the operator to know in advance that the form image will be largely degraded by the settings made by the operator.

Then, the low-resolution image of the form image is scaled according to the calculated scaling ratio (step S1706), followed by terminating the present process.

As described above, when the absolute value of the difference between the scaling ratio in the main scanning direction and the scaling ratio in the sub scanning direction is larger than the predetermined value, the CPU 105 notifies the operator that the form image will be largely degraded.

Thus, the process for editing a form image is executed when image repeating and form synthesis are designated, whereby it is possible to create a form image according to the operator's instruction, similarly to the embodiment.

FIGS. 21A to 21C, and 22A and 22B are diagrams showing examples of screens displayed on the console section 110 appearing in FIG. 2.

Figure 21A:
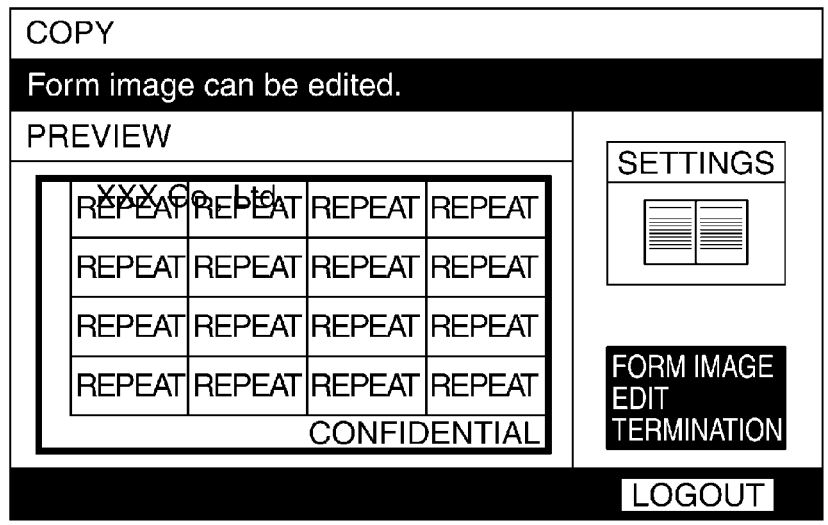

FIG. 21A shows a screen displayed on the console section 110 in a state where the operator has already made settings of image repeating and form synthesis, depressed the preview read button 904, and depressed the image edit button 906.

In FIG. 21A, let it be assumed that the operator performs a pinch-in operation to adapt the form image currently synthesized with the whole area of the print size e.g. to the upper right repeat image. Processing for detecting the pinch-in operation for adapting the form image to the upper right repeat image is similar to the detection processing described hereinabove.

Figure 21B:
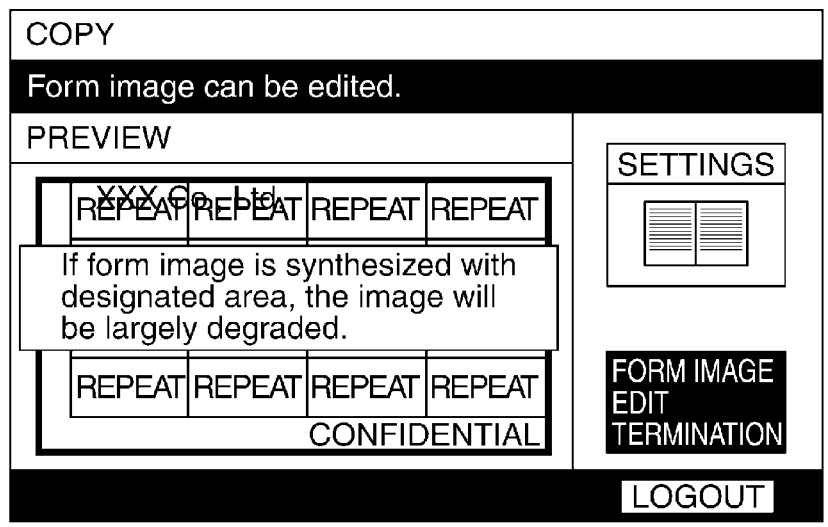

FIG. 21B shows a screen displayed on the console section 110 when the step S1705 has been executed after the determination in the step S1704 so as to create the form image in a manner adjusted to the area designated by the operator according to the pinch-in operation on the screen shown in FIG. 21A.

In the present variation, an alert shown in FIG. 21B is displayed by way of example, but this is not limitative.

FIG. 21C shows a screen displayed on the console section 110 which is the preview display created by synthesizing the form image with the upper right repeat image according to the instruction from the operator. Further, FIG. 22A shows a screen displayed on the console section 110 which inquires of the operator about whether or not to synthesize the form image also with each of the other repeat images duplicated by image repeating.

Figure 22A:
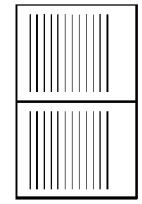

This transition from the FIG. 21C screen to the FIG. 22A screen may be automatically performed e.g. after the lapse of a predetermined time period, or the FIG. 22A screen may be directly displayed without displaying the FIG. 21C screen.

On the screen shown in FIG. 22A, if the operator selects "Yes", the preview image created by synthesizing the form image with each of all the repeat images is displayed. FIG. 22B shows a screen displayed on the console section 110 which displays the preview image created by synthesizing the form image with each of all the repeat images.

As described above, in the second variation, the process for editing a form is executed when image repeat and form synthesis are designated. As described above, in image repeating, there is a possibility that a repeat image of an irregular size desired by the operator may be selected. This makes it is difficult to prepare form images adapted to image repeating in advance. However, according the second variation, it is possible to edit and create a form image, as described above, which enables the operator to easily perform processing from preparation of a form image to configuration of settings of the MFP.

In the above-described embodiment and first variation, the aggregate image is created by aggregating a plurality of different images on one page, and in the second variation, the aggregate image is created by aggregating a plurality of identical images on one page.

As described heretofore, although it has been conventionally necessary to prepare in advance form images adapted to N-in-1 or image repeating, the present invention makes it possible to configure the settings of N-in-1 or image repeat and form synthesis, only by preparing a minimum number of form images, and print images according to the configured settings.

Further, even for a user who has no knowledge of layout involving N-in-1 or image repeating, it is possible to provide a simplified and intuitive user interface which enables the user to edit a form image, using the preview display and the touch panel.

Further, for the sake of user's operation for editing a form image on the touch panel, a grid of the form image is caused to be adjusted based on the layout information of N-in-1 or image repeating. Therefore, it is possible to create a form image which is accurately adjusted to the layout of N-in-1 or image repeating by a simplified operation.

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2012-233625, filed Oct. 23, 2012, which is hereby incorporated by reference herein in its entirety.

What is claimed is:

1. An image processing apparatus comprising:
a processor connected to a memory, the processor and memory being configured to:
acquire image data;
store a form image;
accept, from a user, form synthesis settings of printing a synthesized image created by synthesizing the image data and the form image;

accept, from a user, aggregate printing settings of printing an aggregate image of printing an aggregate image created by aggregating a plurality of image data on one page;

select, in a case where the form synthesis settings are accepted and the aggregate printing settings are accepted, one of a first layout in which the form image is synthesized with the whole aggregate image and a second layout in which the form image is synthesized with each of the plurality of image data; and print according to the selected one of the first layout and the second layout.

2. The image processing apparatus according to claim 1, the processor and memory being further configured to:

display a preview image of the first layout in which the form image is synthesized with the whole aggregate image; and accept, from a user, a touch operation of changing a layout of the form image for the preview image, wherein any one of the first layout and the second layout is selected based on the accepted touch operation.

3. The image processing apparatus according to claim 2, wherein the touch operation includes a pinch-in operation, a pinch-out operation, and a rotation operation.

4. The image processing apparatus according to claim 1, the processor and memory being further configured to read an original, wherein the image data comprises an original image for the original.

5. A method of controlling an image processing apparatus, comprising:

acquiring image data;

storing a form;

accepting, from a user, form synthesis settings of printing a synthesized image created by synthesizing the image data and the form image;

accepting, from a user, aggregate printing settings of printing an aggregate image of printing an aggregate image created by aggregating a plurality of image data on one page;

select, in a case where the form synthesis settings are accepted and the aggregate printing settings are accepted, one of a first layout in which the form image is synthesized with the whole aggregate image and a second layout in which the form image is synthesized with each of the plurality of image data; and printing according to the selected one of the first layout and the second layout.

6. A non-transitory computer-readable storage medium storing a computer-executable control program for causing a computer to execute a method of controlling an image processing apparatus, wherein the method comprises:

acquiring image data;

storing a form;

accepting, from a user, form synthesis settings of printing a synthesized image created by synthesizing the image data and the form image;

accepting, from a user, aggregate printing settings of printing an aggregate image of printing an aggregate image created by aggregating a plurality of image data on one page;

select, in a case where the form synthesis settings are accepted and the aggregate printing settings are accepted, one of a first layout in which the form image is synthesized with the whole aggregate image and a second layout in which the form image is synthesized with each of the plurality of image data; and printing according to the selected one of the first layout and the second layout.

* * * * *